US012711840B2

(12) United States Patent
Sadlik et al.

(10) Patent No.: US 12,711,840 B2
(45) Date of Patent: Aug. 18, 2026

(54) METHODS AND SYSTEMS FOR ENHANCED HISTORICAL HORSE RACING GAMES

(71) Applicant: PariMAX Holdings LLC, Hunt Valley, MD (US)

(72) Inventors: Kyle Sadlik, Reistertown, MD (US); Greg Lindo, McDonough, GA (US); John Hemler, Columbia, MD (US); Chris Drake, Hampshire, IL (US)

(73) Assignee: PariMAX Holdings LLC, Hunt Valley, MD (US)

( * ) Notice: Subject to any disclaimer, the term of this patent is extended or adjusted under 35 U.S.C. 154(b) by 238 days.

(21) Appl. No.: 18/610,428

(22) Filed: Mar. 20, 2024

(65) Prior Publication Data

US 2025/0022345 A1 Jan. 16, 2025

Related U.S. Application Data

(60) Provisional application No. 63/526,797, filed on Jul. 14, 2023.

(51) Int. Cl.
*G07F 17/32* (2006.01)

(52) U.S. Cl.
CPC ...... *G07F 17/3288* (2013.01); *G07F 17/3225* (2013.01); *G07F 17/3244* (2013.01)

(58) Field of Classification Search
CPC ............. G07F 17/3288; G07F 17/3225; G07F 17/3244
USPC ............................................................ 463/25
See application file for complete search history.

(56) References Cited

U.S. PATENT DOCUMENTS

| | | | | |
|---|---|---|---|---|
| 5,275,400 | A | 1/1994 | Weingardt | |
| 6,786,824 | B2 * | 9/2004 | Cannon | G07F 17/32 463/16 |
| 7,458,891 | B2 | 12/2008 | Asher | |
| 7,566,268 | B2 * | 7/2009 | Asher | G07F 17/3288 463/16 |

(Continued)

FOREIGN PATENT DOCUMENTS

WO 2022067040 A1 3/2022

OTHER PUBLICATIONS

Ainsworth, "Historical Horse Racing," Retrieved from the Internet on Aug. 25, 2023: https://www.agtslots.com/us/markets/hhr, pp. 1-19.

(Continued)

*Primary Examiner* — Allen Chan
(74) *Attorney, Agent, or Firm* — Resolute Legal PLLC

(57) ABSTRACT

Methods and systems for operating a gaming server may include receiving a plurality of first game selections associated with a first game and converting them into a plurality of horse race game selections. The methods and systems may include requesting a draw of horse races from an electronic race day control server (ERDC) and receiving a plurality of horse race from the ERDC. A random number generator is used to generate a random number, which is used to select a horse race from the plurality of horse race based on an association between the randomly generated number and the selected horse race. Game outcomes are determined based on the plurality of horse race game selections and the selected horse race. The game outcomes and the selected horse race video are sent to at least one electronic game machine.

30 Claims, 17 Drawing Sheets

(56) References Cited

U.S. PATENT DOCUMENTS

| | | | |
|---|---|---|---|
| 7,637,807 | B2 | 12/2009 | Asher |
| 8,360,835 | B2 | 1/2013 | Strause |
| 8,632,392 | B2 | 1/2014 | Shore |
| 9,047,737 | B2 | 6/2015 | Brooks |
| 9,053,608 | B2 | 6/2015 | Brooks |
| 9,218,721 | B2 | 12/2015 | Herbert |
| 9,443,392 | B2 | 9/2016 | Keech |
| 10,395,471 | B2 | 8/2019 | Lind |
| 10,510,210 | B2 | 12/2019 | Williams |
| 10,810,841 | B2 | 10/2020 | Nelson |
| 11,080,966 | B2 | 8/2021 | Merati |
| 11,107,328 | B2 | 8/2021 | Nelson |
| 11,189,133 | B2 | 11/2021 | Neely |
| 11,257,318 | B2 | 2/2022 | Thomas |
| 11,276,272 | B2 | 3/2022 | Casey |
| 11,354,979 | B2 | 6/2022 | Higgins |
| 11,393,280 | B2 | 7/2022 | Nelson |
| 11,410,503 | B2 | 8/2022 | Nelson |
| 11,521,463 | B1 | 12/2022 | Higgins |
| 11,651,655 | B2 | 5/2023 | Fulton |
| 11,663,882 | B1 | 5/2023 | Witt |
| 11,727,753 | B2 | 8/2023 | Maya |
| 2002/0177483 | A1 | 11/2002 | Cannon |
| 2006/0084491 | A1 | 4/2006 | DiCarlo |
| 2009/0069077 | A1 | 3/2009 | Saito et al. |
| 2010/0041453 | A1 | 2/2010 | Grimm, Jr. |
| 2015/0262452 | A1* | 9/2015 | Corckran ............ G07F 17/3295 463/28 |
| 2017/0372561 | A1 | 12/2017 | Aronson et al. |
| 2019/0251789 | A1 | 8/2019 | Waters |
| 2021/0043043 | A1 | 2/2021 | Burns et al. |
| 2021/0090405 | A1 | 3/2021 | Nelson et al. |
| 2021/0158661 | A1 | 5/2021 | Fulton et al. |
| 2022/0246000 | A1 | 8/2022 | Fulton |
| 2023/0019741 | A1 | 1/2023 | Neely et al. |
| 2023/0129999 | A1 | 4/2023 | Keech |

OTHER PUBLICATIONS

Encorerbg, "Encore Racing Based Games Announces Entry Into Historic Horse Racing Market," PR Newswire, Feb. 12, 2015, pp. 1-2.

International Game Technology Inc., "IGT Unveils Wheel of Fortune-Themed Games at Churchill Downs Incorporated Historical Horse Racing Facilities in Kentucky," PR Newswire, May 24, 2021, pp. 1-3.

Parimax, "Maximize Gaming Floor Revenue," Retrieved from the Internet on Aug. 25, 2023: https://parimax.com/, pp. 1-7.

Dennis Rudd et al., "Racinos—The Marriage of Horse Racetracks and Casino/Slots-Style Gambling—Friends or Foes?," Journal of Case Research in Business and Economics 1 (2009): pp. 28-35.

* cited by examiner

410

Bet to Pool Conversion Mapping

| Roulette Bet | Horse Race Bet Conversion |
|---|---|
| Straight Up, Line, Corner, Street, or Split | Exacta |
| Even or Odd | Win |
| Red or Black | Win |
| Numbers 1 through 18 or Number 19 through 36 | Win |
| Numbers 1 through 12 or 13 through 24 or 25 through 36 | Win |
| All Columns | Win |

*FIG. 4A*

420

Horse Race to Pool Mapping

| Horse Race | Parimutuel Bet Pool |
|---|---|
| Race 1 | Exacta (Straight Up, Line, Corner, Street, and Split) |
| Race 2 | Win (Even or Odd) |
| Race 3 | Win (Red or Black) |
| Race 4 | Win (Numbers 1 through 18 or Number 19 through 36) |
| Race 5 | Win (Numbers 1 through 12 or 13 through 24 or 25 through 36) |
| Race 6 | Win (All Columns) |

*FIG. 4B*

425

Roulette Ball to Horse Race Mapping

| Exacta Pools | | | | | | | |
|---|---|---|---|---|---|---|---|
| Roulette Ball | Horse Race Runners | Roulette Ball | Horse Race Runners | Roulette Ball | Horse Race Runners | Roulette Ball | Horse Race Runners |
| 1 | 1,2 | 11 | 2,6 | 21 | 4,3 | 31 | 6,1 |
| 2 | 1,3 | 12 | 2,7 | 22 | 4,5 | 32 | 6,2 |
| 3 | 1,4 | 13 | 3,1 | 23 | 4,6 | 33 | 6,3 |
| 4 | 1,5 | 14 | 3,2 | 24 | 4,7 | 34 | 6,4 |
| 5 | 1,6 | 15 | 3,4 | 25 | 5,1 | 35 | 6,5 |
| 6 | 1,7 | 16 | 3,5 | 26 | 5,2 | 36 | 6,7 |
| 7 | 2,1 | 17 | 3,6 | 27 | 5,3 | 0 | 7,1 or 7,2 |
| 8 | 2,3 | 18 | 3,7 | 28 | 5,4 | 00 | 7,3 or 7,4 |
| 9 | 2,4 | 19 | 4,1 | 29 | 5,6 | 000 | 7,5 or 7,6 |
| 10 | 2,5 | 20 | 4,2 | 30 | 5,7 | | |
| | | | | | | | |

430

| Win (Even or Odd) | |
|---|---|
| Roulette Ball | Horse Race Runners |
| Odd | 1 or 3 or 5 |
| Even | 2 or 4 or 6 |
| 0 or 00 or 000 | 7 |

435

| Win (Red or Black) | |
|---|---|
| Roulette Ball | Horse Race Runners |
| Red | 1 or 3 or 5 |
| Black | 2 or 4 or 6 |
| 0 or 00 or 000 | 7 |

*FIG. 4C*

Roulette Ball to Horse Race Mapping

440

| Win (Numbers 1 through 18 or 19 through 36) | |
|---|---|
| **Roulette Ball** | **Horse Race Runners** |
| 1 through 18 | 1 or 3 or 5 |
| 19 through 36 | 2 or 4 or 6 |
| 0 or 00 or 000 | 7 |

445

| Win (Numbers 1 through 12 or 13 through 24 or 25 through 36) | |
|---|---|
| **Roulette Ball** | **Horse Race Runners** |
| 1 through 12 | 1 or 2 |
| 23 through 24 | 3 or 4 |
| 25 through 36 | 5 or 6 |
| 0 or 00 or 000 | 7 |

450

| Win (Columns) | |
|---|---|
| **Roulette Ball** | **Horse Race Runners** |
| Column 1 | 1 or 2 |
| Column 2 | 3 or 4 |
| Column 3 | 5 or 6 |
| 0 or 00 or 000 | 7 |

*FIG. 4D*

METHODS AND SYSTEMS FOR ENHANCED HISTORICAL HORSE RACING GAMES

CROSS REFERENCE TO RELATED APPLICATION

This application is a Nonprovisional of U.S. Provisional Application No. 63/526,797, filed Jul. 14, 2023, the contents of which are hereby incorporated by reference.

FIELD OF THE DISCLOSURE

Implementations of the disclosure relate to enhancements in horse race based entertainment systems, providing enhanced functionality and technical improvements over existing computing systems.

BACKGROUND

In many jurisdictions, gambling games driven by random number generators are not allowed. In some of those jurisdictions, other types of wagering games like horse racing are allowed.

Historical horse racing wagering terminals, also known as HHR wagering terminals, are a type of gambling game that combines legal horse race wagering with a slot machine style player interface. HHR wagering terminals have gained popularity in certain states in the United States where they are legal.

The concept behind historical horse racing wagering terminals involves the use of recordings of previously run horse races. The HHR wagering terminals enable players place bets on the outcome of previously run horse races (e.g., without knowing the horse race that is to be used). The HHR slot machine may display video replays of past horse races and also display to the player a game interface that usually appears like a traditional slot machine game. The horse races shown on the HHR can be from approved racetracks and can feature races from decades ago. Once player bets are placed, an outcome for the slot machine can be determined based on the outcome of a past horse race.

The payouts to players resulting from the horse races are determined by a system known as pari-mutuel wagering, which is commonly used in horse racing. Pari-mutuel wagering pool bets placed on a particular race, deducts a percentage for the house, and distributes the remaining pool among the winning bets.

While HHR wagering terminals are known to contain games that display reels, there is a desire to create new historical horse racing-based games with more complexity than reel based games to keep players entertained. However, pairing historical horse racing with more complex games has previously been too difficult to implement. Thus, there is a need for new and improved historical horse racing games.

BRIEF SUMMARY

In some aspects, the techniques described herein relate to a method of operating a gaming server, including: receiving a plurality of a first game selections associated with a first game; converting the plurality of first game selections into a plurality of horse race game selections, wherein the first game is different from a horse race game; sending, to a horse race selection generator, a request for a randomly generated horse race selection value; receiving a randomly generated horse race selection value; requesting, from an electronic race day control server (ERDC), a draw of horse races based on the randomly generated horse race selection value; receiving a plurality horse races from the ERDC that are based on the randomly generated horse race selection value; determining game outcomes based on the plurality of horse race game selections and at least one of the received plurality of horse races; updating at least one player account associated with the plurality of first game selections according to the determined game outcomes; and sending the game outcomes and a video of the at least one of the received plurality of horse races to at least one electronic game machine.

In some aspects, the techniques described herein relate to a method, wherein the first game selections are associated with wagers, wherein the wagers are associated with at least one wagering pool.

In some aspects, the techniques described herein relate to a method, wherein the received plurality of horse races correspond to different horse race wagers.

In some aspects, the techniques described herein relate to a method, further including: determining the game outcomes by comparing the plurality of horse race game selections against the race outcomes in the received plurality of horse races.

In some aspects, the techniques described herein relate to a method, wherein the request for the randomly generated horse race selection value is sent to a random number generator that is associated with the first game.

In some aspects, the techniques described herein relate to a method, wherein the first game uses a physical wheel to enable determination of a randomly generated horse race selection value.

In some aspects, the techniques described herein relate to a method, wherein the first game uses a physical roulette wheel to determine the randomly generated horse race selection value.

In some aspects, the techniques described herein relate to a method, wherein the first game uses at least one die to determine the randomly generated horse race selection value.

In some aspects, the techniques described herein relate to a method, wherein the first game uses an electronic random number generator to determine the randomly generated horse race selection value.

In some aspects, the techniques described herein relate to a method, wherein the plurality of first game selections include a plurality of wagers on the first game and the plurality of horse race game selections include a plurality of horse race wagers.

In some aspects, the techniques described herein relate to a method, further including sending a request to a pricing system to determine prices for the plurality of horse race wagers.

In some aspects, the techniques described herein relate to a method, wherein determining the game outcomes based on the plurality of horse race wagers and the at least one of the received plurality of horse races further includes: evaluating the plurality of horse race wagers against an outcome in the at least one of the received plurality of horse races; and calculating payouts for at least one wagering pool associated with the first game selections.

In some aspects, the techniques described herein relate to a method, further including calculating the payouts for a plurality of wagering pools associated with different ones of the first game selections.

In some aspects, the techniques described herein relate to a method, wherein sending the game outcomes and the video of the at least one of the received plurality of horse races to the at least one electronic game machine further includes sending the game outcomes and the video of the at least one of the received plurality of horse races through a proxy server.

In some aspects, the techniques described herein relate to a method, wherein the plurality of the first game selections associated with the first game include different wagers made in a roulette game, wherein at least two wagers of the different wagers are associated with different parimutuel wager pools.

In some aspects, the techniques described herein relate to a method, wherein a first wager of the different wagers made in the roulette game is converted into a first type of horse race wager on a first horse race and a second wager of the different wagers made in the roulette game is converted into a second type of horse race wager on a second horse race.

In some aspects, the techniques described herein relate to a method, wherein a first wager of the different wagers made in the roulette game is converted into a first horse race wager on a horse race and a second wager of the different wagers made in the roulette game is converted into a second horse race wager on the horse race, wherein the second horse race wager selects at least one different horse to win from at least one horse selected to win in the first horse race wager.

In some aspects, the techniques described herein relate to a gaming server, including: at least one processor; and at least one memory that stores computer executable instructions, wherein, when the computer executable instructions are executed by the at least one processor, the at least one processor is configured to: receive a plurality of a first game selections associated with a first game; convert the plurality of first game selections into a plurality of horse race game selections, wherein the first game is different from a horse race game; send, to a horse race selection generator, a request for a randomly generated horse race selection value; receive a randomly generated horse race selection value; requesting, from an electronic race day control server (ERDC), a draw of horse races based on the randomly generated horse race selection value; receiving a plurality horse races from the ERDC that are based on the randomly generated horse race selection value; determine game outcomes based on the plurality of horse race game selections and at least one of the received plurality of horse races; update at least one player account associated with the plurality of first game selections according to the determined game outcomes; and send the game outcomes and a video of the at least one of the received plurality of horse races to at least one electronic game machine.

In some aspects, the techniques described herein relate to a gaming server, wherein the first game selections are associated with wagers, wherein the wagers are associated with at least one wagering pool.

In some aspects, the techniques described herein relate to a gaming server, wherein the received plurality of horse races correspond to different horse race wagers.

In some aspects, the techniques described herein relate to a gaming server, wherein the computer executable instructions further cause the at least one processor to: determine the game outcomes by comparing the plurality of horse race game selections against the race outcomes in the received plurality of horse races.

In some aspects, the techniques described herein relate to a gaming server, wherein the request for the randomly generated horse race selection value is sent to a random number generator that is associated with the first game.

In some aspects, the techniques described herein relate to a gaming server, wherein the first game uses a physical wheel to enable determination of the randomly generated horse race selection value.

In some aspects, the techniques described herein relate to a gaming server, wherein the first game uses a physical roulette wheel to determine the randomly generated horse race selection value.

In some aspects, the techniques described herein relate to a gaming server, wherein the first game uses at least one die to determine the randomly generated horse race selection value.

In some aspects, the techniques described herein relate to a gaming server, wherein the first game uses an electronic random number generator to determine the randomly generated horse race selection value.

In some aspects, the techniques described herein relate to a gaming server, wherein the plurality of first game selections includes a plurality of wagers on the first game and the plurality of horse race game selections include a plurality of horse race wagers.

In some aspects, the techniques described herein relate to a gaming server, wherein the computer executable instructions further cause the at least one processor to: send a request to a pricing system to determine prices for the plurality of horse race wagers.

In some aspects, the techniques described herein relate to a gaming server, wherein when determining the game outcomes based on the plurality of horse race wagers and the at least one of the received plurality of horse races, the computer executable instructions further cause the at least one processor to: evaluate the plurality of horse race wagers against outcomes in the at least one of the received plurality of horse races; and calculate payouts for at least one wagering pool associated with the first game selections.

In some aspects, the techniques described herein relate to a gaming server, wherein the computer executable instructions further cause the at least one processor to: calculate the payouts for a plurality of wagering pools associated with different ones of the first game selections.

In some aspects, the techniques described herein relate to a gaming server, wherein when sending the game outcomes and the video of the at least one of the received plurality of horse races to the at least one electronic game machine, the computer executable instructions further cause the at least one processor to: send the game outcomes and the video of the at least one of the received plurality of horse races through a proxy server.

In some aspects, the techniques described herein relate to a gaming server, wherein the plurality of the first game selections associated with the first game include different wagers made in a roulette game, wherein at least two wagers of the different wagers are associated with different parimutuel wager pools.

In some aspects, the techniques described herein relate to a gaming server, wherein a first wager of the different wagers made in the roulette game is converted into a first type of horse race wager on a first horse race and a second wager of the different wagers made in the roulette game is converted into a second type of horse race wager on a second horse race.

In some aspects, the techniques described herein relate to a gaming server, wherein a first wager of the different wagers made in the roulette game is converted into a first horse race wager on a horse race and a second wager of the different wagers made in the roulette game is converted into a second horse race wager on the horse race, wherein the second horse race wager selects at least one different horse to win from at least one horse selected to win in the first horse race wager.

BRIEF DESCRIPTION OF THE FIGURES

FIG. 4A, FIG. 4B, FIG. 4C, and FIG. 4D are illustrations of various associations or mappings between selections in a first game and selections in a horse racing game.

DETAILED DESCRIPTION

Figure 1:
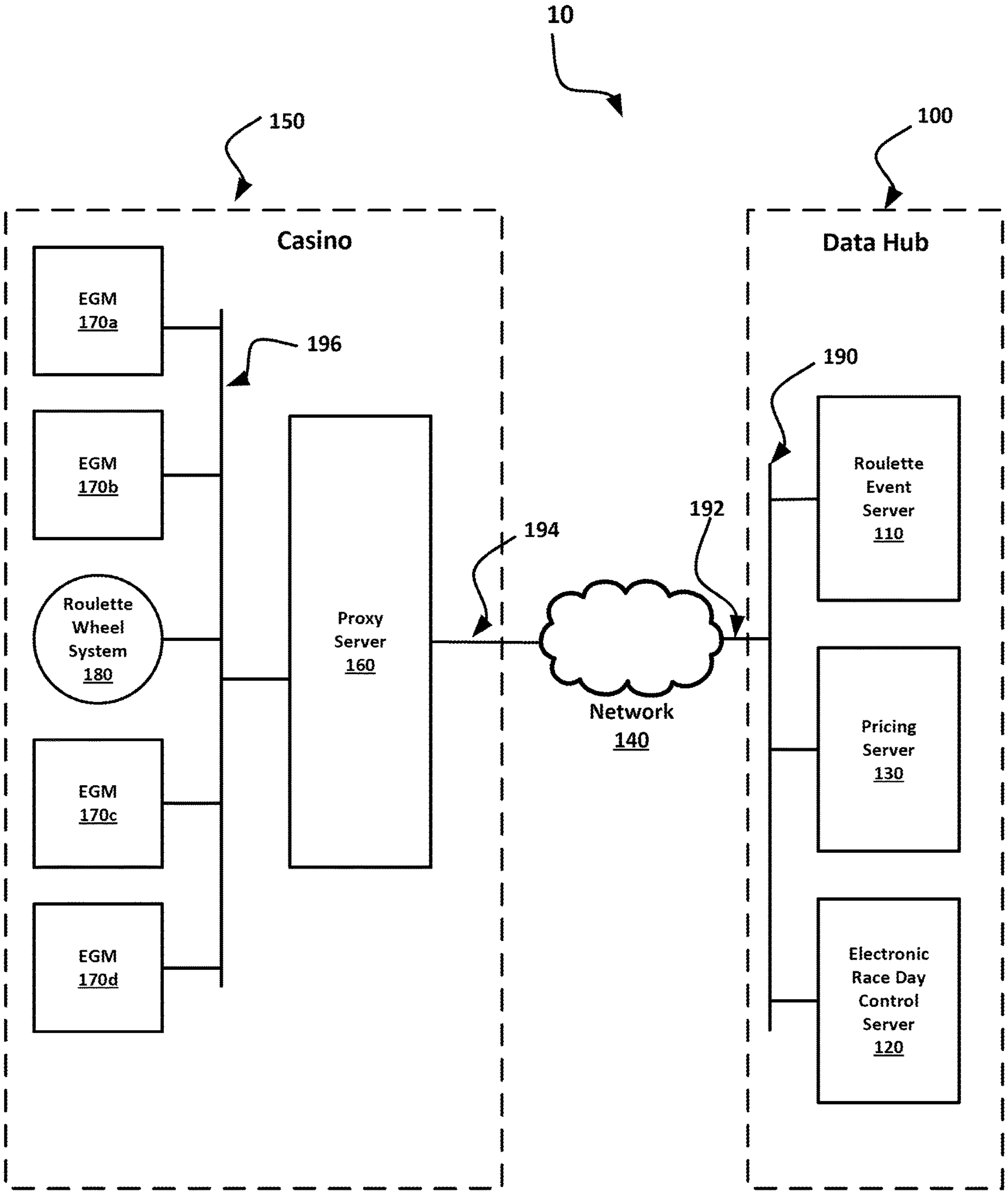
FIG. 1 is a block diagram illustrating a system, according to some implementations of the present disclosure.

FIG. 1 is a block diagram that describes a system 10, according to some implementations of the present disclosure. In some implementations, system 10 may include portions of a system in a data hub 100 and portions of the system in a casino 150. In some implementations, the system 10 may include a roulette event server 110, an electronic race day control server 120, a pricing server 130, a network 140, a proxy server 160, a plurality of electronic game machines, such as electronic game machine 170*a*, electronic game machine 170*b*, electronic game machine 170*c*, electronic game machine 170*d*, and a roulette wheel system 180. In some implementations, these systems work together to provide an improved historical horse racing game that can incorporate aspects of casino table games such as roulette.

In some implementations, some portions of system 10 can be located in the data hub 100. In some implementations, data hub 100 can be a data center or a cloud-based computing system. In some implementations, data hub 100 may include one or more servers, such as roulette event server 110, electronic race day control server 120, pricing server 130, as well as other suitable servers that may be related operating system 10 or unrelated to system 10. In various implementations, system 10 may include one or more data hubs 100 that house one or more of the devices such as roulette event server 110, electronic race day control server 120, and pricing server 130.

Figure 8:
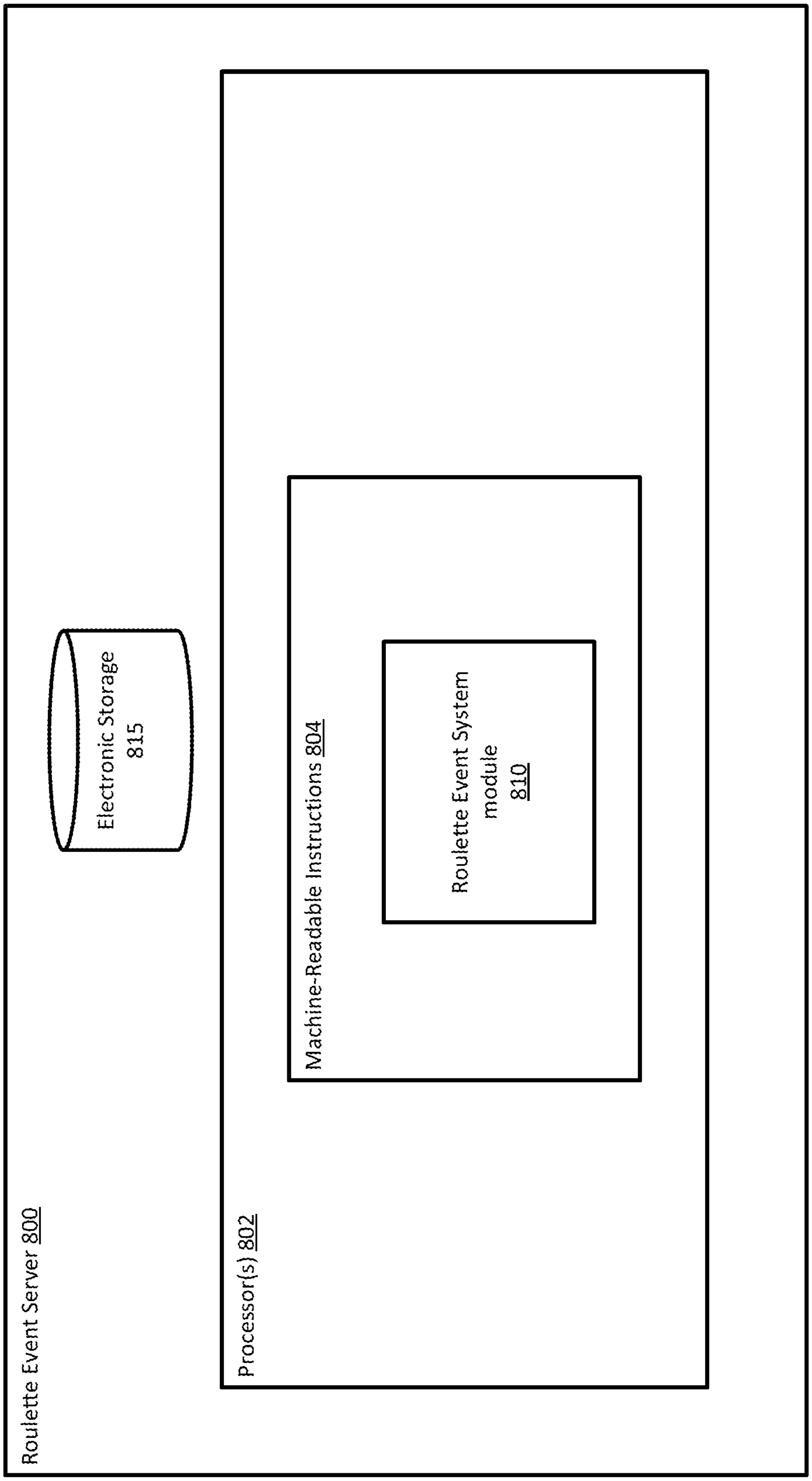
FIG. 8 is a block diagram illustrating a roulette event server 800 according to some implementations of the present disclosure.

In some implementations, roulette event server 110 is a server, such as described in FIG. 8. In some implementations, roulette event server 110 is configured to, among other things, control the opening and closing of pari-mutuel betting pools, accept and process wager and cancel wager requests, instruct one or more roulette wheel systems (e.g., roulette wheel system 180, roulette wheel system 604, etc.) to operate (e.g., to release a roulette ball, spin the roulette wheel, determine the outcome of a roulette wheel spin), and establish and select appropriate horse races obtained from the ERDC. In some implementations, the roulette event server 110 comprise a computer and/or a server. In some implementations, the roulette event server 110 may comprise stand-alone computing devices. In some implementations, roulette event server 110 may include, but is not limited to, interface devices such as computer monitors, touch screens, buttons, etc. In some implementations, roulette event server 110 may include one or more processors, one or more types of non-transitory memory devices (e.g., RAM, ROM, etc.), network interface devices, etc. By way of non-limiting example, the roulette event server 110 may include one or more of a server, a desktop computer, a laptop computer, a handheld computer, and/or other suitable computing platforms. The structure and functions of some implementations of the roulette event server 110 will be described in greater detail herein. In some implementations, data hub 100 may include one or more roulette event servers.

Figure 7:
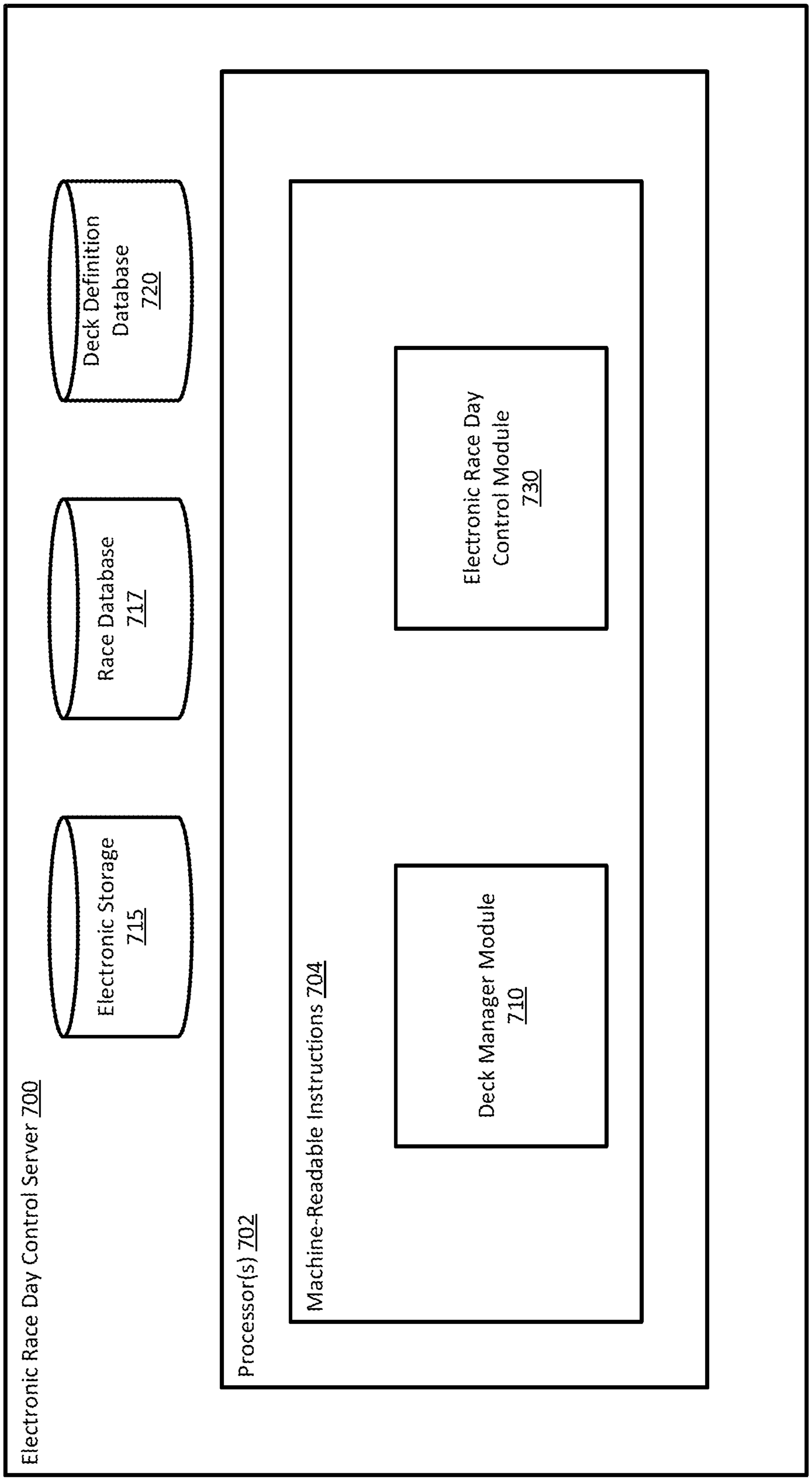
FIG. 7 is a block diagram illustrating an electronic race day control (ERDC) server, according to some implementations of the present disclosure.

In some implementations, electronic race day control server 120 (also referred to herein as an ERDC server) is a server, such as described in FIG. 7. In some implementations, electronic race day control server 120 is configured to, among other things, to create and/or obtain one or more draws (as will be described in greater detail below) and provide one or more draws to roulette event server 110. In some implementations, electronic race day control server 120 may include other functions, such as race deck creation and management, storing historical horse races, and storing race deck definitions that are associated with different game interfaces (e.g., roulette games, craps games, blackjack games, etc.) that can be paired with the historical horse racing system 10. In various implementations, one or more of these functions can be handed by one or more different servers. In some implementations, the electronic race day control server 120 comprises a computer and/or a server. In some implementations, the electronic race day control server 120 may comprise stand-alone computing devices. In some implementations, electronic race day control server 120 may include, but is not limited to, interface devices such as computer monitors, touch screens, buttons, etc. In some implementations, electronic race day control server 120 may include one or more processors, one or more types of non-transitory memory devices (e.g., RAM, ROM, etc.), network interface devices, etc. By way of non-limiting example, the electronic race day control server 120 may include one or more of a server, a desktop computer, a laptop computer, a handheld computer, and/or other suitable computing platforms. The structure and functions of some implementations of the electronic race day control server 120 will be described in greater detail below. In some implementations, data hub 100 may include one or more electronic race day control servers.

In some implementations, system 10 may include a pricing server 130. In some implementations, pricing server 130 is configured to evaluate bets against the results of horse races and determine the payout of bets for one or more parimutuel wagering pools. While bets are described herein as bets for one or more parimutuel wagering pools, it should be appreciated that other types of suitable betting structures can be used, such as fixed odds wagering. In some implementations, pricing server 130 may include more or fewer functions. In some implementations, pricing server 130 performs one or more functions of a horse race totalizator. In some implementations, one or more functions of pricing server 130 are performed by a horse race totalizator. In some implementations, the pricing server 130 comprises a computer and/or a server. In some implementations, the pricing server 130 may comprise stand-alone computing devices. In some implementations, pricing server 130 may include, but is not limited to, interface devices such as computer monitors, touch screens, buttons, etc. In some implementations, pricing server 130 may include one or more processors, one or more types of non-transitory memory devices (e.g., RAM, ROM, etc.), network interface devices, etc. By way of non-limiting example, the pricing server 130 may include one or more of a server, a desktop computer, a laptop computer, a handheld computer, and/or other suitable computing platforms. Additional functions of some implementations of the pricing server 130 will be described in greater detail below. In some implementations, data hub 100 may include one or more pricing servers.

In some implementations, the devices in data hub 100 can be in communication with each other. For example, in some implementations, roulette event server 110, electronic race day control server 120, and pricing server 130 can be in communication with each other through a suitable network, such as network 190. In some implementations, network 190 is at least one local area network (LAN). In some implementations, network 190 is a plurality of LANs. In some implementations, network 190 is at least one wide area network (WAN). In some implementations, network 190 is a plurality of WANs. In some implementations, network 190 is a combination of one or more LAN networks and one or more WAN networks. In some implementations, the LAN and/or WAN networks are hardwired networks (e.g., Ethernet™, fiber optic, etc.). In some implementations, one or more LAN and/or WAN networks can be a suitable wireless network (e.g., cellular, WiFi™, Bluetooth™, satellite, etc.). In some implementations, network 190 may be connected to a network 140 via a network link 192. In some implementations, network 140 is one or more public networks (e.g., the Internet). In some implementations, network 140 is one or more private networks. In some implementations, network 140 is a combination of one or more public networks and one or more private networks.

In some implementations, the devices in data hub 100 may communicate with one or more devices in a casino 150 or other suitable locations that provide access to historical horse racing games to players. In some implementations, devices that are part of the historical horse racing system 10 in casino 150 may include one or more proxy servers 160 and one or more roulette wheel systems 180 (also referred to herein as a horse race selection generator). In some implementations, one or more electronic game machines (also referred to herein as EGMs) such as, electronic game machine 170*a*, electronic game machine 170*b*, electronic game machine 170*c*, and electronic game machine 170*d* may also be located in casino 150. In some implementations, system 10 may include one or more casinos with one or more of the devices described herein.

In some implementations, casino 150 may include one or more electronic game machines (EGMs). It should be appreciated that casino 150 may include any suitable number of EGMs. In some implementations, an EGM may include a game interface, which provides a way to interact with the EGMs. In some implementations, the game interface provides an entertaining display to a player, enables a player to make or cancel bets/wagers, view their balance, etc. In some implementations, the game interface may include aspects of a first game such as a roulette table, a craps table, a blackjack table, or other suitable game interface. One example of a game interface that can be displayed by an EGM is illustrated in FIG. 3A-FIG. 3G. In some implementations, an EGM may include one or more functions to communicate with the roulette event server 110 or a horse race totalizator service. In some implementations, an EGM can be configured with a totalizator API system, which can enable the EGM to communicate with the roulette event server 110. In some implementations, the totalizator API system is a software application that can runs in parallel with the game interface of the EGM and other services necessary to implement a historical horse racing game. In some implementations, the totalizator API system allows for connections from a game interface in the EGM via a remote procedure call (RPC) protocol to communicate directly or indirectly with the roulette event server 110 using one or more communications protocol. In some implementations, communications from an EGM through the totalizator API service to the roulette event server 110 can be encrypted.

In some implementations, EGMs are user interface devices that may comprise stand-alone computing devices. In some implementations, EGMs can be client terminals in a client/server system. EGMs can be used to accept player inputs for a game, such as game selections, wagers, player tracking cards, etc. EGMs may include, but are not limited to, player interface devices such as computer monitors, touch screens, buttons, card and ticket readers, ticket printers, etc. In some implementations, EGMs may include or be in communication with one or more cashless wallet systems for accepting player funds that can be converted credits or chips for wagers. EGMs may include one or more processors, one or more types of non-transitory memory devices (e.g., RAM, ROM, etc.), network interface devices, etc. By way of non-limiting example, given EGMs may include one or more of a server, a desktop computer, a laptop computer, a handheld computer, a tablet computing platform, a smartphone, a gaming console, and/or other computing platforms. In some implementations, the EGMs may be associated with certain other EGMs, such as may be found around a shared game device, like a roulette wheel or a roulette wheel system 180. In some implementations, EGMs can be used to play one or more different games.

In some implementations, the devices in casino 150 can be in communication with each other. For example, in some implementations, electronic game machine 170*a*, electronic game machine 170*b*, electronic game machine electronic game machine 170*c*, electronic game machine 170*d*, proxy server 160, and roulette wheel system 180 can be in communication with each other through a suitable network, such as network 196. In some implementations, network 196 is at least one local area network (LAN). In some implementations, network 196 is a plurality of LANs. In some implementations, network 196 is at least one wide area network (WAN). In some implementations, network 196 is a plurality of WANs. In some implementations, network 196 is a combination of one or more LAN networks and one or more WAN networks. In some implementations, the LAN and/or WAN networks are hardwired networks (e.g., Ethernet™, fiber optic, etc.). In some implementations, one or more LAN and/or WAN networks can be a suitable wireless network (e.g., cellular, WiFi™, Bluetooth™, satellite, etc.). In some implementations, network 196 may be connected to a network 140 via a network link 194.

In some implementations, the EGMs communicate with the roulette event server 110 through a proxy server 160. In some implementations, casino 150 may include one or more proxy servers such as proxy server 160. In some implementations, proxy server 160 can be configured to be a central hub for communication to and from EGMs. In some implementations, proxy server 160 can translate messages from the EGMs and send them to the roulette event server 110. In some implementations, proxy server 160 can also be configured to act as a dynamic host control protocol (DHCP) server for the EGMs to establish the Internet Protocol (IP) addresses for the EGMs and roulette wheel systems. In some implementations, the proxy server 160 comprise a computer and/or a server. In some implementations, the proxy server 160 may comprise stand-alone computing devices. In some implementations, proxy server 160 may include, but is not limited to, interface devices such as computer monitors, touch screens, buttons, etc. In some implementations, proxy server 160 may include one or more processors, one or more types of non-transitory memory devices (e.g., RAM, ROM, etc.), network interface devices, etc. By way of non-limiting example, the proxy server 160 may include one or more of a server, a desktop computer, a laptop computer, a handheld computer, and/or other suitable computing platforms. Additional functions of some implementations of the proxy server 160 will be described in greater detail below.

In some implementations, casino 150 includes one or more horse race selection generators, such as roulette wheel system 180. In some implementations, the roulette wheel system 180 is configured to generate random numbers for the system 10 that are used as part of the game. In some implementations, the roulette wheel system 180 can include physical roulette wheel and ball, which can be used to determine at least one number, as is traditionally used in a roulette game. In some implementations, where the roulette wheel system 180 system includes a physical roulette wheel, a ball can be propelled around the roulette wheel. When the ball lands/stops in one of the numbered pockets of the roulette wheel, the random number can be determined by the roulette wheel system 180, which can be used by other systems as a horse race selection value. In some implementations, the roulette wheel system 180 may include a method to manually release the ball and detect the pocket number where the ball stopped. In some implementations, the roulette wheel system 180 may include a method to automatically release the ball and detect the pocket number where the ball stopped. The roulette wheel system 180 may detect the pocket where the balled stopped using techniques such as image recognition (e.g., using image or video capture and analyzing the image or video capture to determine the pocket number), radio transmitters in the ball or roulette pockets, or other suitable detection techniques. In some implementations, the roulette wheel system 180 may provide a remote video feed of a roulette wheel in which outcomes generated at the remote roulette wheel can be transmitted to the roulette wheel system 180 to use in a historical horse racing game of system 10. In some implementations, where the game interface of an EGM is not a roulette game, a different system can be used to generate random numbers. For example, if a craps game is used as the game interface at an EGM, dice may be used in place of the roulette wheel and ball to generate one or more random numbers. In an alternative implementation, if a card game is used as the game interface at an EGM, cards may be used in place of the roulette wheel and ball to generate one or more random numbers.

In some implementations, in place of a physical roulette wheel, the roulette wheel system 180 may include one or more random number generator (RNG) modules such as a hardware random number generator and/or a software pseudo random number generator. In some implementations, the RNG module is in communication with at least one processor of the roulette wheel system 180. In some implementations, the RNG module of the roulette wheel system 180 may vary depending on the type of game played at the EGMs (e.g., roulette, cards, dice games, etc.). In some implementations, the roulette wheel system 180 may include physical or video screen depictions of a roulette wheel that depict a random numbers generation sequence that was generated by a software true RNGs or a software pseudo RNGs. In some implementations, one or more functions of the roulette wheel system 180 can be incorporated into an EGM or other suitable device of system 10.

In some implementations, the roulette wheel system 180 includes a computer and/or a server. In some implementations, the roulette wheel system 180 may comprise stand-alone computing devices. In some implementations, roulette wheel system 180 may include, but is not limited to, interface devices such as computer monitors, touch screens, buttons, etc. In some implementations, roulette wheel system 180 may include one or more processors, one or more types of non-transitory memory devices (e.g., RAM, ROM, etc.), network interface devices, etc. By way of non-limiting example, the roulette wheel system 180 may include one or more of a server, a desktop computer, a laptop computer, a handheld computer, and/or other suitable computing platforms.

Figure 2A:
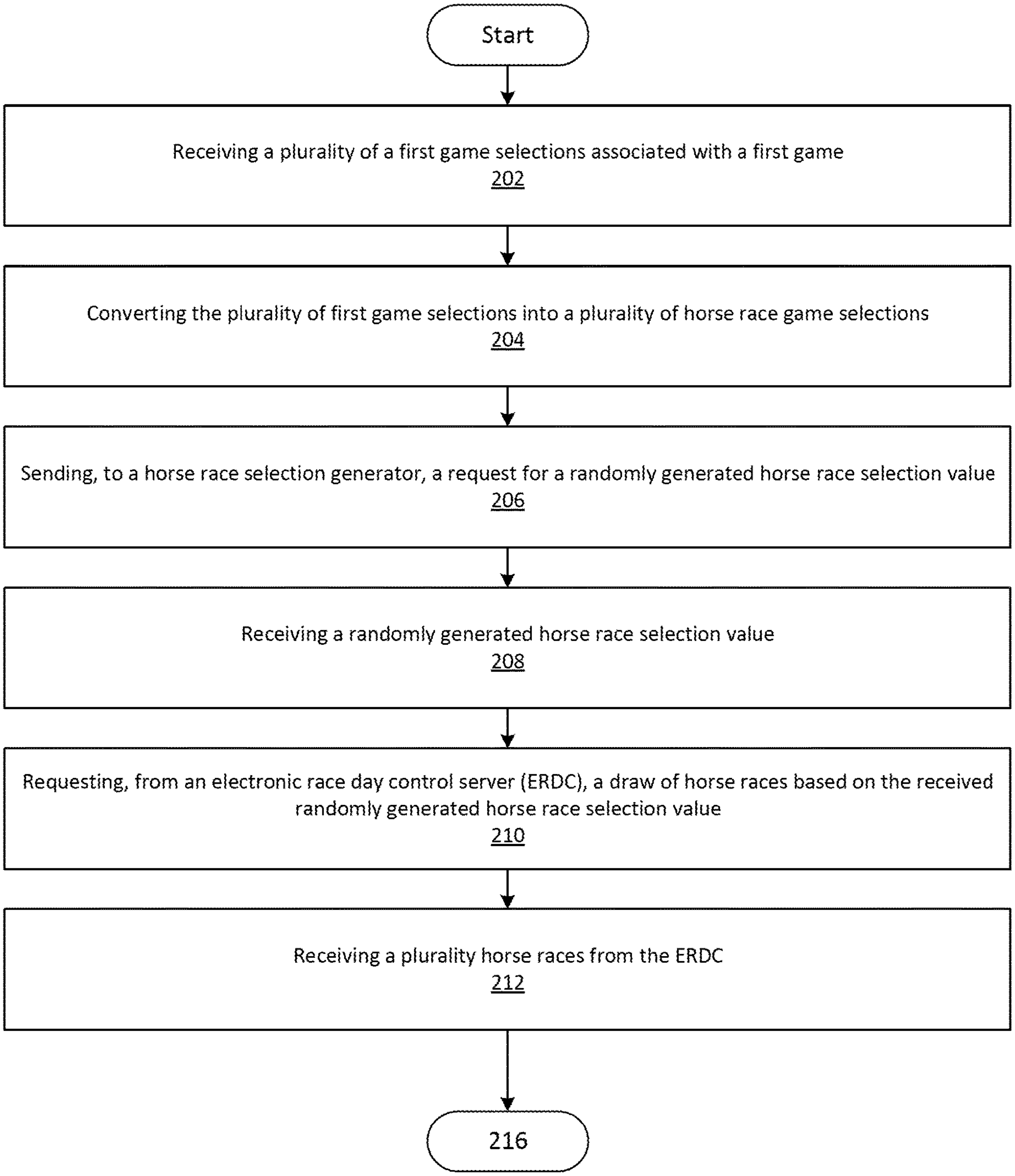
FIG. 2A is a flowchart illustrating a method of operating a gaming server, according to some implementations of the present disclosure.
Figure 2B:
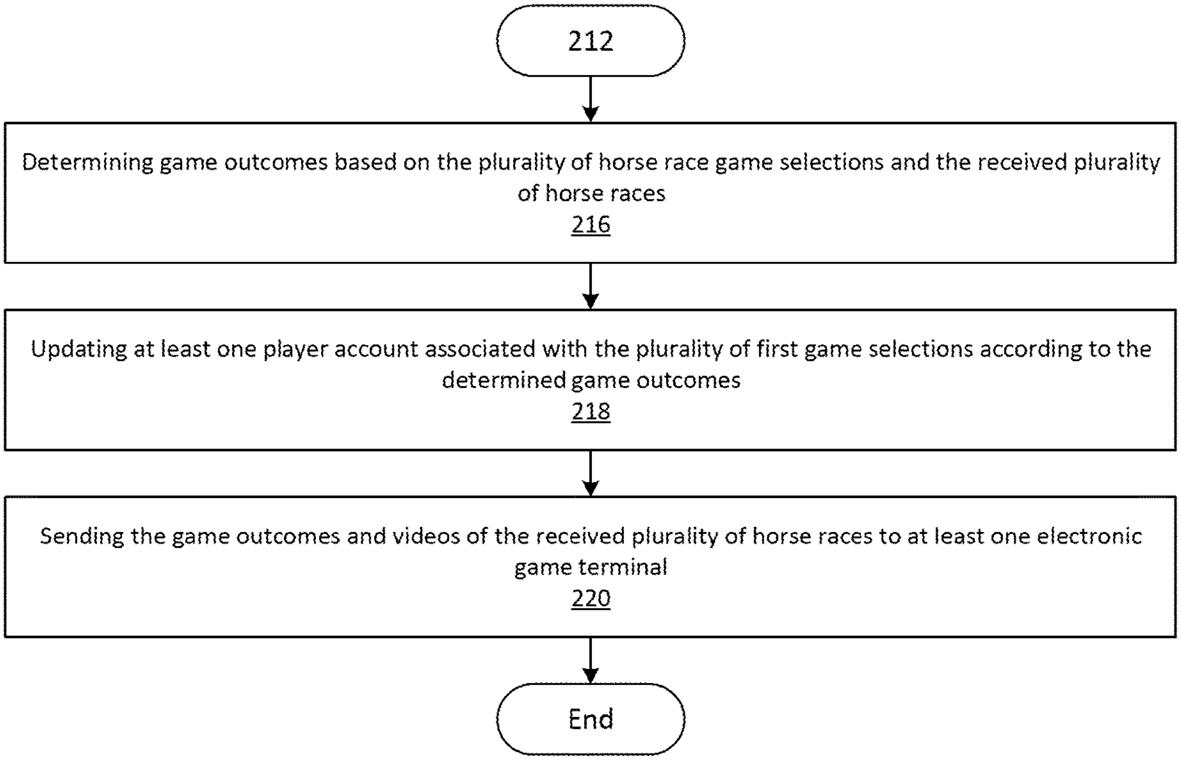
FIG. 2B is a flowchart extending from FIG. 2A and further illustrating the method of operating a gaming server, according to some implementations of the present disclosure.

FIG. 2A and FIG. 2B are flowcharts that describe a method of operating a portion of a gaming system according to some implementations of the present disclosure. In some implementations, the gaming system is a historical horse racing game that has been combined with the interface of another game (e.g., roulette, blackjack, etc.). In some implementations, the player can interact with the gaming system using a first game, such as a roulette style interface (e.g., place roulette style bets on a roulette table), but ultimately the player's wagers are converted to horse racing wagers and the outcome of a play of the gaming system is associated with the horse racing wagers placed on historical horse races. FIG. 3A, FIG. 3B, FIG. 3C, FIG. 3D, FIG. 3E, FIG. 3F, and FIG. 3G are illustrations of user interfaces and operations of the gaming system of, according to some implementations of the present disclosure. FIG. 3A-FIG. 3G will be described in connection with FIG. 2A and FIG. 2B to provide a further visual aid for the method of operating some implementations of the gaming system. FIG. 4A, FIG. 4B, FIGS. 4C, and 4D are illustrations of various associations or mappings between a first game (e.g., a roulette game) and horse racing games. FIG. 4A-FIG. 4D will also be described in connection with FIG. 2A and FIG. 2B to provide further visual aids for the method of operating some implementations of the gaming system. It should be appreciated that the order of the process illustrated in FIG. 2A and FIG. 2B is merely one implementation of a method. In some implementations, the process illustrated in FIG. 2A and FIG. 2B may include more blocks or fewer blocks. In some implementations, the order of the blocks in FIG. 2A and FIG. 2B can be arranged in a different order than illustrated and described herein.

Figure 3A:
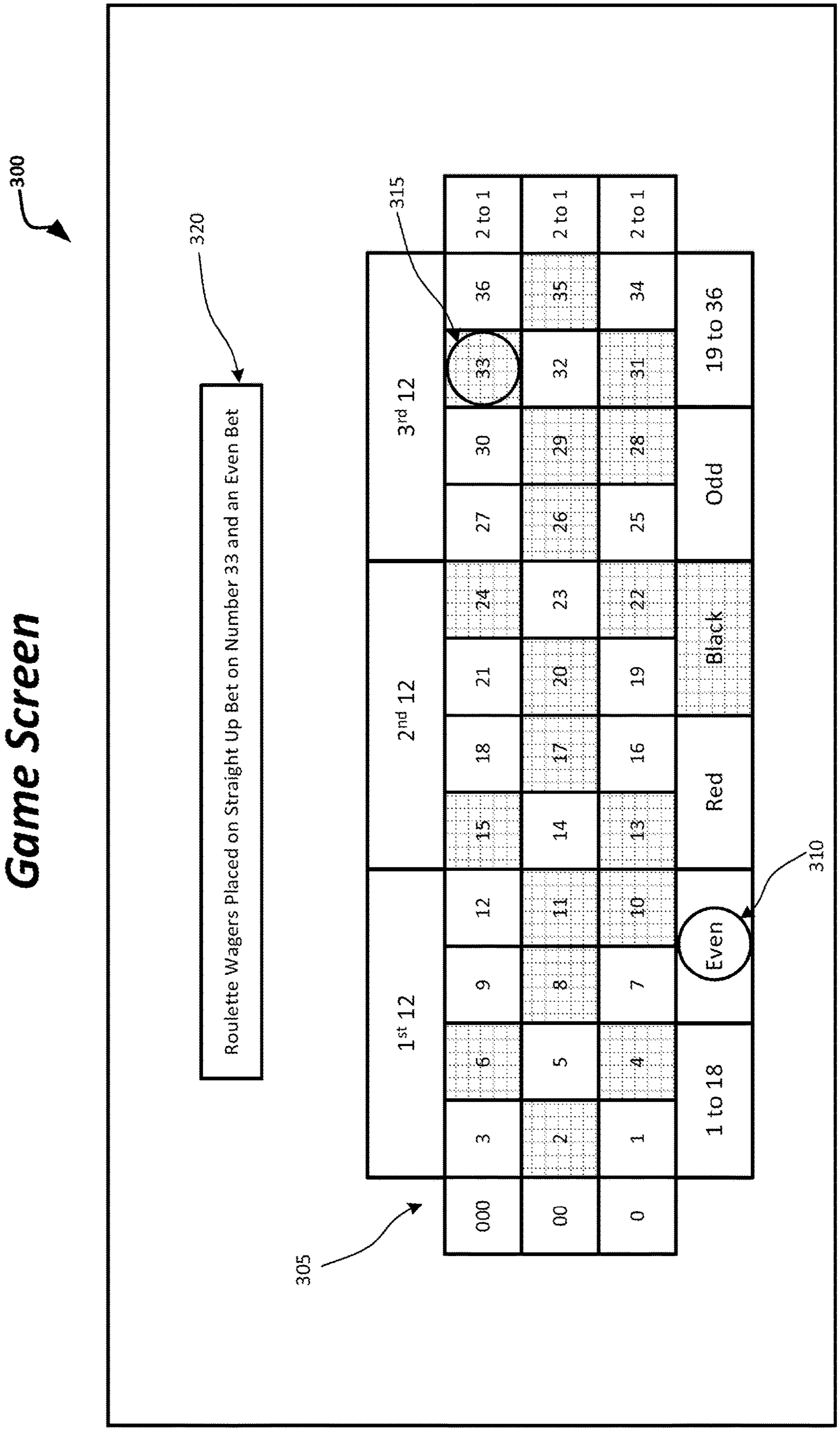
FIG. 3A, FIG. 3B, FIG. 3C, FIG. 3D, FIG. 3E, FIG. 3F, and FIG. 3G are illustrations of user interfaces and operations of a gaming system providing a historical horse racing game, according to some implementations of the present disclosure.

In some implementations, at 202, the method may include receiving, at a roulette event server (e.g., roulette event server 110), a plurality of a first game selections associated with a first game. For example, in some implementations, as illustrated in FIG. 3A, an EGM (e.g., electronic game machine 170*a*, etc.) may present a game screen 300 to the player with game interface. As shown in FIG. 3A, a roulette style table 305 is presented to the player. In some implementations, the player may place one or more roulette style bets on the roulette style table 305. For example, the player can touch one or more segments on the roulette style table 305 to make the player's bet selections. As shown in FIG. 3A, the circle 315 highlights that the player selected the number 33 for a straight roulette style bet. As also shown in FIG. 3A, circle 310 highlights that the player selected an Even roulette style bet for a bet on Even numbers. It should be appreciated that the selections shown in FIG. 3A are merely for explanation purposes and a player can select any suitable one or more segments on the roulette style table 305 in various implementations. In some implementations, the game screen 300 may provide a message 320 to the player to confirm that the player placed roulette style wagers on the number 33 and Even numbers. In some implementations, a message is not provided. While not shown in FIG. 2A or FIG. 3A, in some implementations, the bets collected at an EGM may be initially sent to a proxy server (e.g., proxy server 160) before being sent to the roulette event server. It should be appreciated that the game screen 300 may display any suitable information to the player and is not limited to the information provided in the examples from FIG. 3A-FIG. 3G. While a roulette interface is described as an example of a first game, it should be appreciated that other suitable first games can be incorporated (e.g., dice based games, card based games, etc.).

At 204, the method may include converting, at the roulette event server, the plurality of first game selections into a plurality of horse race game selections. For example, in some implementations, if the player is provided a roulette style interface as shown in FIG. 3A, the roulette style bets can be converted into one or more horse race bets. For example, in some implementations, if the player is provided a different first game as the interface to make game selections, the player's game selections in the different first game can be converted into one or more horse race bets. Turning to the example roulette style game interface provided in FIG. 3A, in some implementations, one or more roulette style bets are associated/mapped to one or more horse race bets. Examples of association/mapping between roulette style bets and horse race bets are illustrated in FIG. 4C and FIG. 4D. For example, in one implementation of the gaming system, the tables shown in FIG. 4C and FIG. 4D illustrate 56 different roulette bets that are available. For example, the roulette ball columns in table 425 denote roulette style straight bets. To the right of the roulette ball columns in table 425 are listings of the associated/mapped horse race bets. For example, a roulette style straight bet on the number 1 means that the roulette event server may convert such roulette style bet into an exacta bet on horse 1 taking first place and horse 2 taking second place (e.g., denoted as horse race runners 1, 2). As another example, a roulette style straight bet on the number 24 means that the roulette event server may convert such roulette style bet on the number 24 into an exacta bet on horse 4 taking first place and horse 7 taking second place (e.g., denoted as horse race runners 4, 7). As yet another example, a roulette style straight bet on the set of numbers 25-36 means that the roulette event server may convert such roulette style bet on the set of numbers 25-36 into two win bets (e.g., one on horse 5 taking first place and one on horse 6 taking first place) (e.g., denoted as horse race runners 5 or 6). It should be appreciated that the association/mappings between roulette style bets and horse race bets shown in FIG. 4C and FIG. 4D are merely for explanation purposes and different mappings can be used between roulette style bets and horse race bets. It should also be appreciated that the quantity of association/mappings between roulette style bets and horse race bets is also merely for explanation purposes and more or fewer associations/mappings can be configured for the gaming system. In some implementations, the conversions between roulette style bets and horse race bets are performed at the roulette event server. In some implementations, the conversions between roulette style bets and horse race bets can be performed at a different device, such as at an EGM.

Figure 3B:
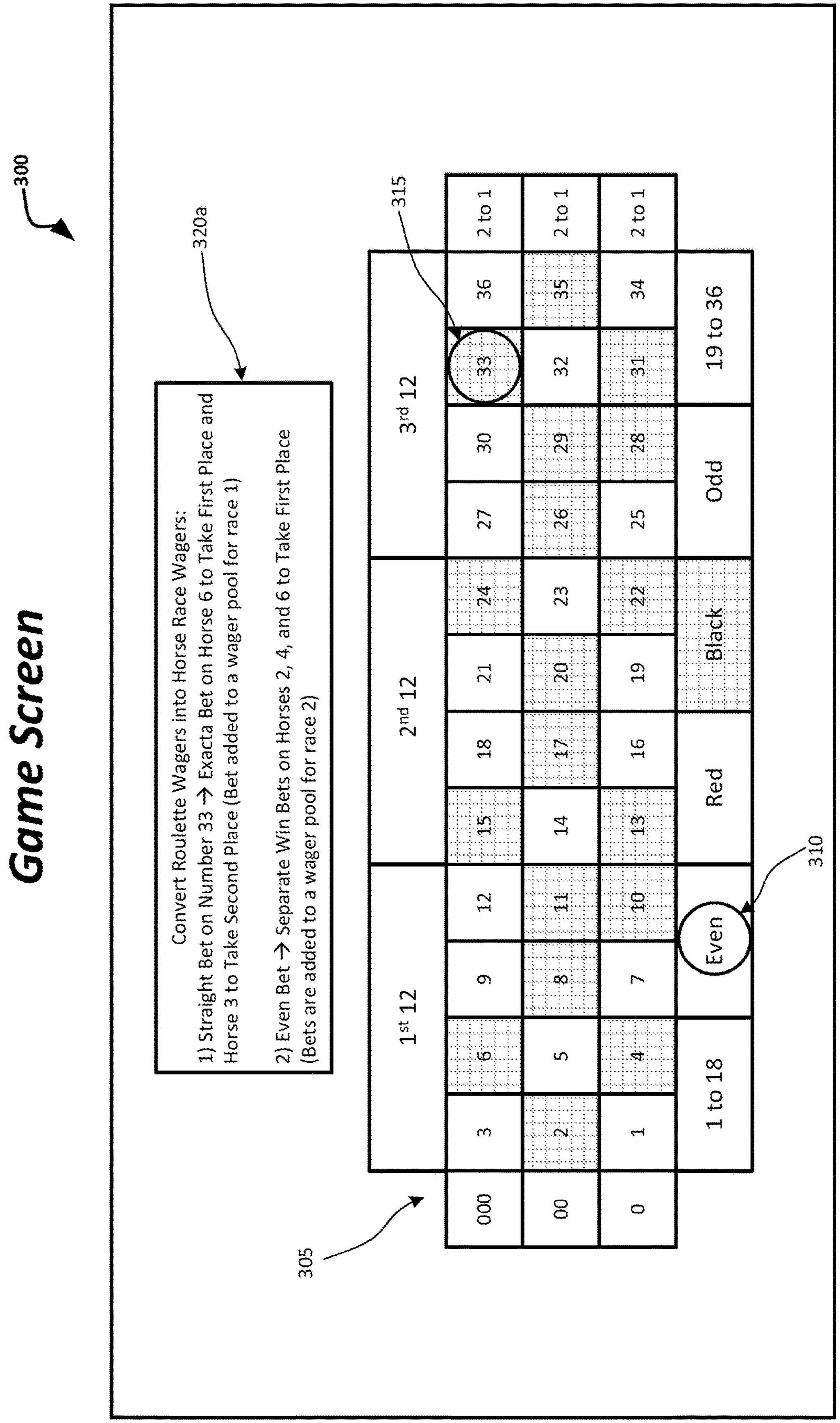

Returning to the example from FIG. 3A, the player's roulette style straight bet on number 33 can be converted to an exacta bet on horse 6 to take first place and horse 3 to take second place. In some implementations, the player's roulette style bet on even numbers can be converted to one or more win bets. In some implementations, for example, the roulette style bet on even numbers can be converted to three separate win bets: one on horse 2 to take first place; one on horse 4 to take first place; and one on horse 6 to take first place. In some implementations, the player's roulette style wager on Even numbers can be divided in any suitable way to support the three separate horse race win bets. In some implementations, as illustrated in FIG. 3B, the game screen 300 may provide a message 320*a* to the player explaining that their roulette style bets have been converted into particular horse race wagers. It should be appreciated that in some implementations, the player is unaware that their roulette style bets have been converted into horse racing bets. As such, in some implementations, game screen 300 does not display message 320*a*.

In some implementations, different bets can be associated with different parimutuel wagering pools. For example, in some implementations, as shown in FIG. 4A, table 410 illustrates a mapping between certain roulette style bets and certain horse race bets. For example, in table 410, a roulette style straight bet is mapped to an exacta parimutuel wagering pool. Thus, in some implementations, a player's straight roulette style bet (e.g., a straight up bet on the number 33) means that such a wager will be added to an exacta parimutuel wagering pool for purposes of calculating payout if the bet is a winning bet. Similarly, in some implementations, a player's bet on even numbers means that such a wager will be added to a win parimutuel wagering pool. It should be appreciated that mappings illustrated in table 410 are merely for explanation purposes and other suitable mappings can be provided to one or more different parimutuel wagering pools. In some implementations, more or fewer parimutuel wagering pools can be used. In some implementations, additional mappings can be used for the gaming system. For example, FIG. 4B illustrates a mapping between particular horse race bets (e.g., in the column Parimutuel Bet Pool) and horse races in table 420. The mapping in table 420 will become apparent below in the discussion regarding game outcome determinations. Returning to FIG. 3B, in some implementations, as illustrated, message 320*a* may indicate that the different player bets are associated with different parimutuel pools. For example, in some implementations, message 320*a* may indicate that the player's roulette style straight bet on the number 33 is associated with a parimutuel pool for race 1 and the player's roulette style bet on even numbers is associated with a parimutuel pool for race 2. As noted above, in some implementations, message 320*a* is not provided and thus the player may be unaware that their converted bets are placed in one or more different parimutuel wagering pools.

Figure 3C:
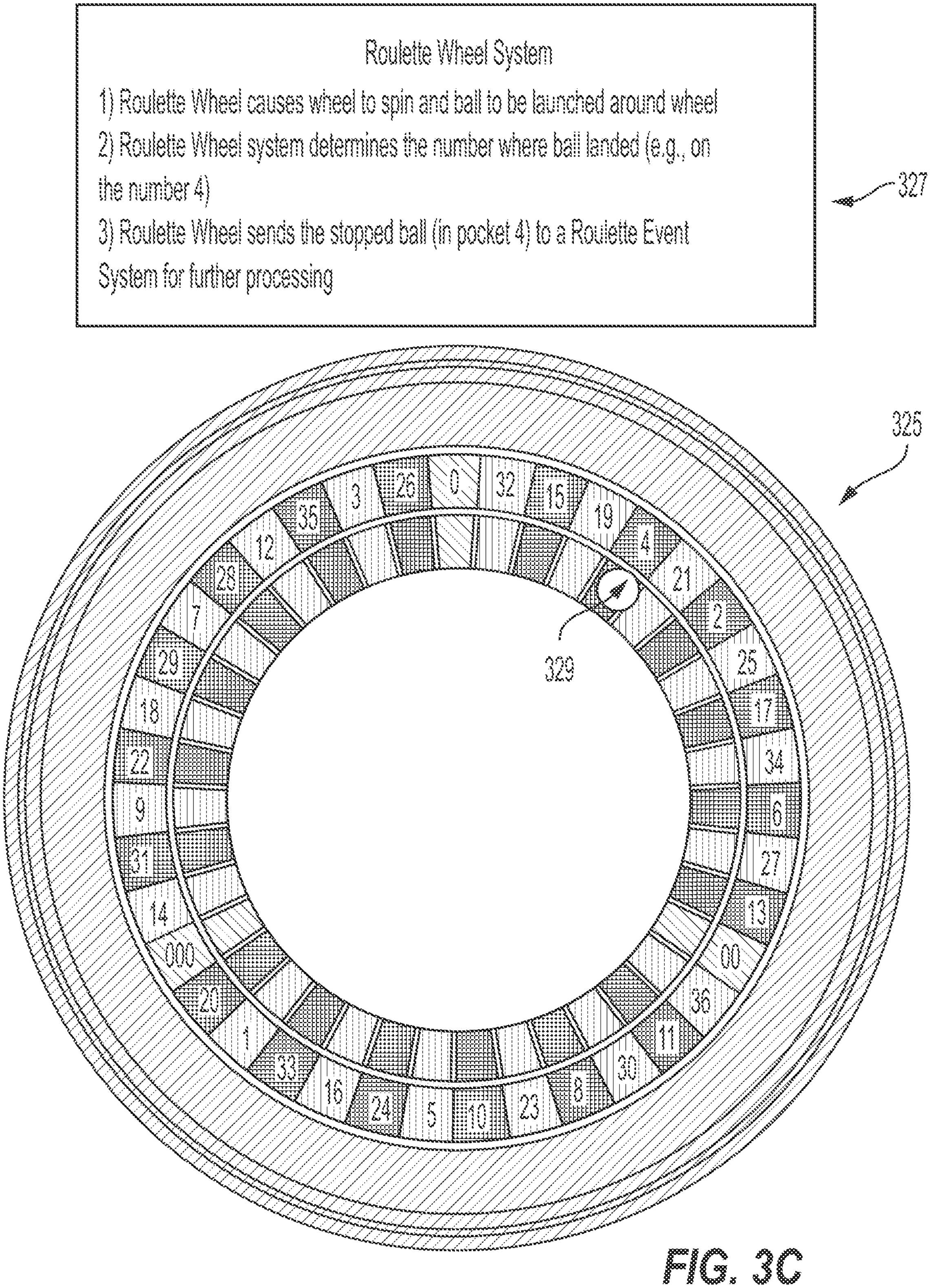

In some implementations, as illustrated at 206, the method may include the roulette event server sending, to a horse race selection generator, a request for a randomly generated horse race selection value. In some implementations, the request is sent through a proxy server (e.g., proxy server 160) and the proxy server sends the request to the horse race selection generator. In some implementations, as discussed above the horse race selection generator can be a device that matches the theme of the player's game interface. For example, if the player is presented with a roulette style game interface at an EGM, the horse race selection generator can be some form of a physical or electronic roulette wheel system, such as was previously discussed. As another example, if the player game interface is a card game, the horse race selection generator may be a physical or electronic card dispenser. As another example, if the player game interface is related to a die or dice based game, the horse race selection generator may be a physical or electronic dice system. In some implementations, the horse race selection generator can be some form of hardware or pseudo random number generator, which can be further associated with a particular game theme. Turning to the example provided in FIG. 3A-FIG. 3G, as illustrated in FIG. 3C, the roulette event server may send the request to a horse race selection generator such as roulette wheel system 325. In some implementations, as shown in the comment 327, upon receiving the request from the roulette event server, the roulette wheel system 325 may spin the roulette wheel and launch the ball 329. The roulette wheel system 325 may determine a random number based on the pocket of the roulette wheel where the ball stopped. In some implementations, the randomly determined number becomes the randomly selected horse race selection value. As noted above, the roulette wheel system can determine the random number one or more different ways. As illustrated in FIG. 3C, the roulette wheel system (e.g., the horse race selection generator) may determine that ball stopped in the pocket associated with the number 4, thus, the roulette wheel system may send a message back to the roulette event server that the randomly generated horse race selection value is 4. In some implementations, the roulette wheel system sends the message including the randomly generated horse race selection value through the proxy server and the proxy server sends the message to the roulette event server.

Figure 3D:
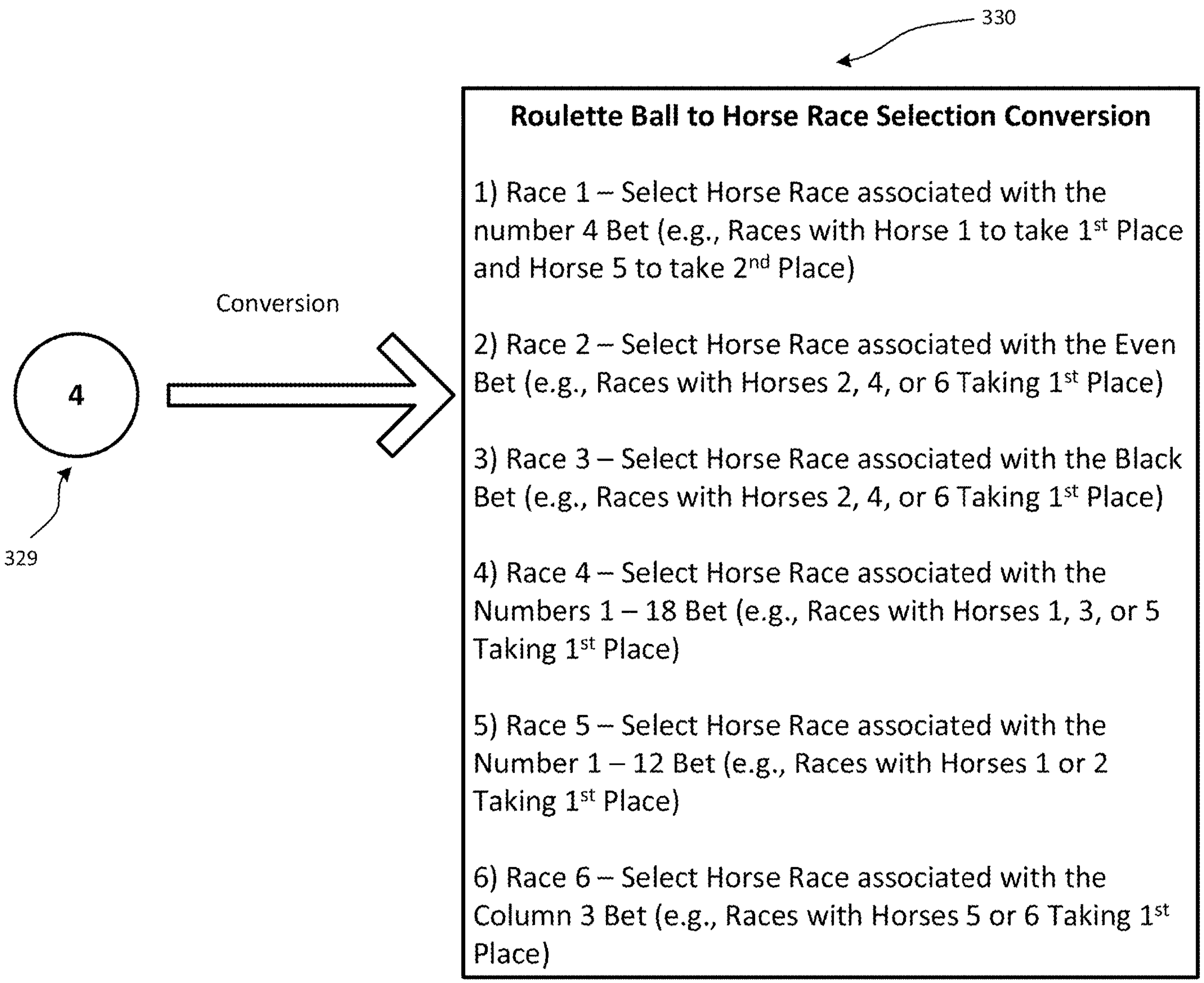

In some implementations, as illustrated at 208, the method may include receiving, at the roulette event server, the randomly generated horse race selection value from the roulette wheel system (e.g., the horse race selection generator). In some implementations, the roulette event server may receive the message from the roulette wheel system through the proxy server. In some implementations, the process in FIG. 2A may include the roulette event server converting the horse race selection value into types of horse races that are associated with particular attributes. An example of the conversion process for determining one or more horse races from the horse race selection value is illustrated in FIG. 3D. The roulette event server may convert the randomly generated horse race selection value 4 into particular types of horse races. In some implementations, the roulette event server may use predetermined associations/mappings between possible roulette outcomes and horse races (e.g., such as found in the tables of FIG. 4C and FIG. 4D) to determine what types of horse races to select. As shown in comment 330 in FIG. 3D, the roulette event system may determine that a roulette ball landing on the number 4 is associated with the following six roulette style bets: a straight bet on the number 4, an even number bet, a bet on black numbers, a bet on the numbers 1-18, a bet on the numbers 1-12, and a bet on column 3. That is, in a roulette style game, the foregoing six roulette style bets would be winning bets if the roulette ball landed on the number 4 and bets were made on these six bet types. These roulette style bets are further mapped to different types of horse races with particular outcome parameters based on the tables in FIG. 4C and FIG. 4D (e.g., a straight bet on the number 4=a horse race with horse 1 taking first place and horse 5 taking second place; an even number bet=a horse race with either horses 2, 4, or 6 taking first place; a bet on black numbers=a horse race with either horses 2, 4, or 6 taking first place; a bet on the numbers 1-18=a horse race with either horses 1, 3, or 5 taking first place; a bet on the numbers 1-12=a horse race with either horses 1 or 2 taking first place; and a bet on column 3=a horse race with either horses 5 or 6 taking first place). While FIG. 3D illustrates determining six different types of horse races from the horse race selection value, in other implementations, the game system may determine fewer or more different types of horse races from the horse race selection value. In some implementations, the determined types of horse races from the horse race selection value help define the horse races that should be selected for a draw of horse races that will be used to determine the game outcomes.

Figure 3E:
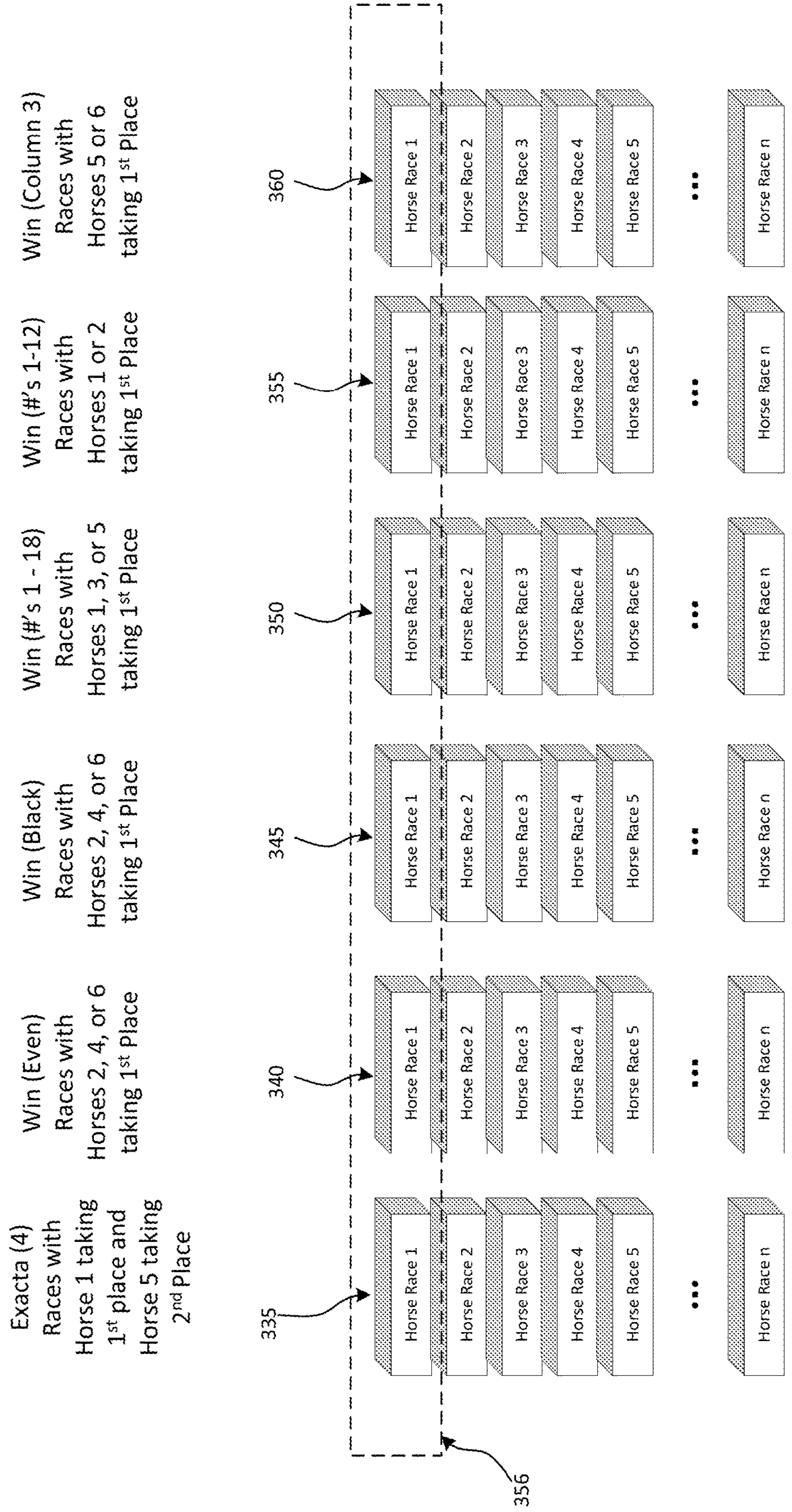

Returning to FIG. 2A, in some implementations, as illustrated at 210, the method may include requesting, from an electronic race day control server (ERDC), a draw of horse races. In some implementations, the request for a draw of races is based on the received randomly generated horse race selection value. In some implementations, a draw is a request for at least one set of historical horse races that are obtained from one or more predetermined sets of historical horse races (e.g., race decks). In some implementations, the horse races in the one or more predetermined sets of historical horse races (e.g., each a race deck) were selected and organized based on predetermined parameters. The predetermined parameters may be captured in deck definitions, wherein the creation of draws and deck definitions are explained in greater detail in connection with FIG. 5. In some implementations, the gaming system can use any suitable quantity of historical horse races for a draw. In some implementations, the quantity of historical horse races that are used to create a draw may depend on the complexity of the player facing game interface (e.g., roulette, blackjack, etc.) used in an EGM. As is discussed in the example shown in FIG. 3A-FIG. 3G, in some implementations of a historical horse racing game using a roulette game interface, a draw of horse races may include a request for 6 individual horse races (although other suitable quantities of horse races can be used). In some implementations, the quantity of 6 individual horse races corresponds to the 6 different parimutuel betting pools (See the table in FIG. 4B and the tables in FIG. 4C and FIG. 4D) the player can win from, which also corresponds to the six types of possible outcomes in a roulette game associated with one ball outcome—represented in the six tables in FIG. 4C and FIG. 4D. In some implementations, these 6 individual horse race videos might be used for one round or play of the game (e.g., one spin of the roulette wheel). As will be discussed below, one or more of the 6 individual horse race videos may be selected and used in the determination of the outcomes of a round of the game. An example illustration of the ERDC creating a draw of horse races is shown in FIG. 3E. FIG. 3E shows the selected six horse races for a draw (e.g., in the selection box 356) that correspond to the generated horse race selection value (e.g., the roulette ball landing in the number 4 pocket): horse race 335 is a horse race with horse 1 taking first place and horse 5 taking second place; horse race 340 is a horse race with either horses 2, 4, or 6 taking first place; horse race 345 is a horse race with either horses 2, 4, or 6 taking first place; horse race 350 is a horse race with either horses 1, 3, or 5 taking first place; horse race 355 is a horse race with either horses 1 or 2 taking first place; horse race 360 is a horse race with either horses 5 or 6 taking first place.

Also illustrated in FIG. 3E are multiple horse race videos under the selected horse races. This is to illustrate that the selected horse races (e.g., top horse races in each column) may be derived from a plurality of different race decks, wherein race decks comprise other horse races with similar outcome parameters. For example, the other horse races under the horse race 335 (e.g., horse race 2, horse race 3-horse race n) may be different horse races that were run at different times or on different tracks, but having the same attributes of horse 1 taking first place and horse 5 taking second place. The creation of race decks is explained in greater detail below in connection with FIG. 5.

While above it was discussed that 6 horse races are selected for a draw, it should be appreciated that other suitable quantities of horse races can be used for a draw (e.g., 56 or some other suitable number) in other implementations. In some implementations, the quantity of 56 individual horse races corresponds to the 56 different horse race bets the player can make after the conversion from a roulette style bet to a horse race bet (See the conversion tables in FIG. 4C and FIG. 4D). In some implementations, a draw may include 56 different horse races and then this set of horse races can be further reduced based on the quantity of horse races that are needed to determine the game outcomes. However, it should be appreciated that using fewer quantities of horse races for a draw is more efficient and provides a technological improvement over using larger quantities of horse races. For example, less processing power and less memory is used when fewer horse races are included in a draw because systems like the ERDC and the roulette event server will not need to process as many horse races to create a draw. Over many plays of the gaming system, computing resources (e.g., memory, processor usage, and power usage) of the ERDC and the roulette event server can be conserved, which results in an improved and more efficient gaming system.

In some implementations, as illustrated at 212, the method may include receiving, at the roulette event server, a plurality horse races from the ERDC. As noted above, the ERDC may send a draw of horse races to the roulette event server. In some implementations, one or more of the horse races will be used to evaluate one or more player bets.

Figure 3F:
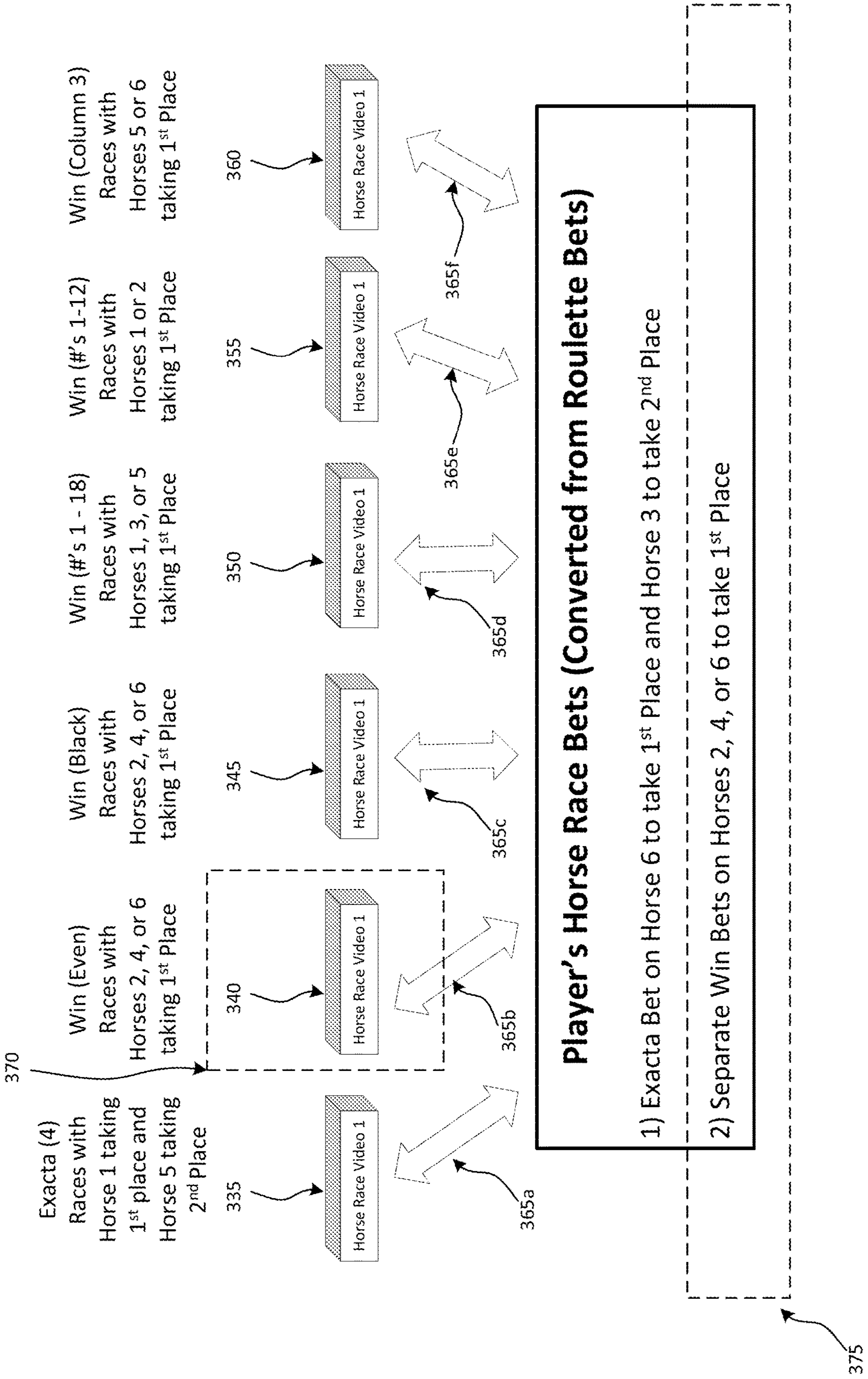

Turning to FIG. 2B, in some implementations, as illustrated at 216, the method may include determining game outcomes based on the plurality of horse race game selections and the received plurality of horse races. In some implementations, the roulette event system sends the plurality of horse race game selections and the received plurality of horse races to a pricing server (e.g., pricing server 130) to make the outcome determinations. In some implementations, the outcome determinations can be made at the roulette event server or some other suitable device. For explanation purposes, FIG. 3F illustrates the evaluation process to determine game outcomes. In some implementations, a horse race from the draw (e.g., metadata associated with a particular horse race—such as the horse that took first place, the horse that took second place, etc.) is compared to a player's converted horse race game selections (e.g., the player's horse race bets converted from the player's roulette bets). For example, the pricing server may compare the outcome of the selected horse race 335 (e.g., a horse race with horse 1 taking first place and horse 5 taking second place) with the player's converted horse race game selections (e.g., an exacta bet on horse 6 to take first place and horse 3 to take second place; and win bets on horses 2, 4, and 6 to take first place) as shown with comparison arrow 365*a*. In this scenario, the evaluation would result in the player's bets not resulting in a winning outcome.

However, in some implementations, the player's converted horse race wagers can be evaluated against one or more of the horse races selected for the draw. For example, in some implementations, the received plurality of horse races from the draw can be compared to the player's converted horse race bets as noted in by the comparison arrow 365*a*, comparison arrow 365*b*, comparison arrow 365*c*, comparison arrow 365*d*, comparison arrow 365*e*, and comparison arrow 365*f*. In this scenario, the evaluation would result in one of the player's bets (e.g., the separate win bets on horses 2, 4, and 6 to take first place) being a winning outcome because horse race video 340 included a race with either horses 2, 4, or 6 taking first place. The matching evaluation is highlighted with box 370 around horse race video 340 and the box 375 around the player's winning converted horse race bet. In some implementations, where the outcome determination is made at the pricing server, the pricing server may send the results of the evaluation to the roulette event server.

Returning to FIG. 2B, in some implementations, as illustrated at 218, the determining may include updating, at the roulette event server, at least one player account associated with the plurality of first game selections according to the determined game outcomes. It should be appreciated that in some implementations, one or more other devices may perform the updating. For example, in some implementations, the updating can be performed by the pricing server or another suitable device.

In some implementations, as illustrated at 220 in FIG. 2B, the method may include sending, from the roulette event server, the game outcomes and videos of the received plurality of horse races to at least one electronic game machine (e.g., EGMs, electronic game machine 170*a*, etc.). In some implementations, the roulette event server may send the game outcomes to one or more EMGs, such as the EGMs that participated in the historical horse racing game (e.g., EGMs where players placed bets, or EGMs associated with a particular roulette wheel system). In some implementations, the roulette event server may send the game outcomes and videos associated with the received plurality of horse races to the EGMs through a proxy server or through some other suitable device. In some implementations, the entirety of the horse race videos are sent to the EGMs. In some implementations, a portion of the horse race videos are sent to the EGMs (e.g., such as just enough to show the outcome of the horse races, or some other suitable portion of the horse races).

Figure 3G:
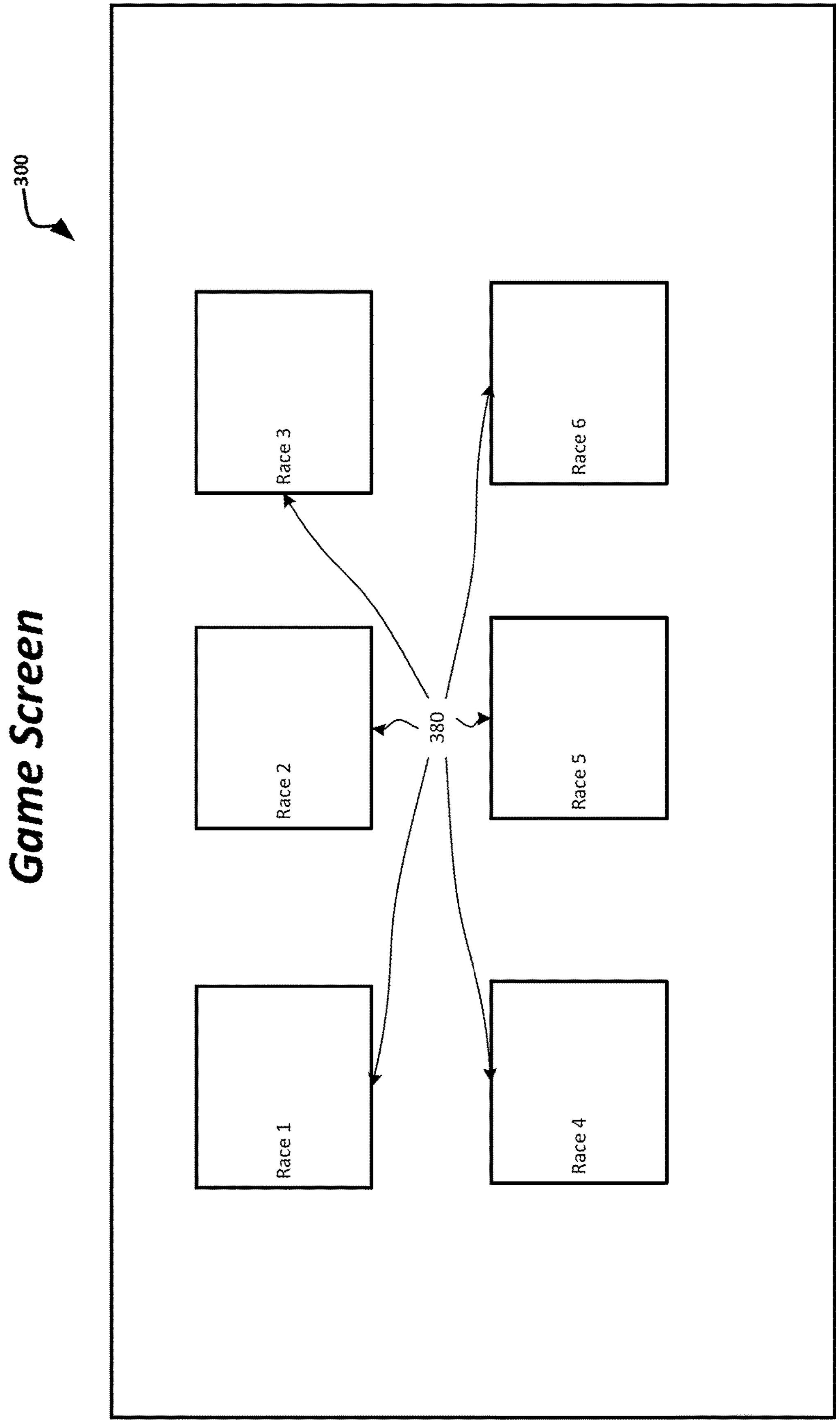

In some implementations, when an EGM receives the game outcomes and the horse race videos, the EMG may display the outcomes to the player (e.g., to show the player what bets were won). In some implementations, the EGM may play back all or some suitable portion of the received selected horse race videos. FIG. 3G illustrates some implementations where the game screen 300 displays the plurality of horse race videos in windows 380 of the game screen 300.

Figure 5:
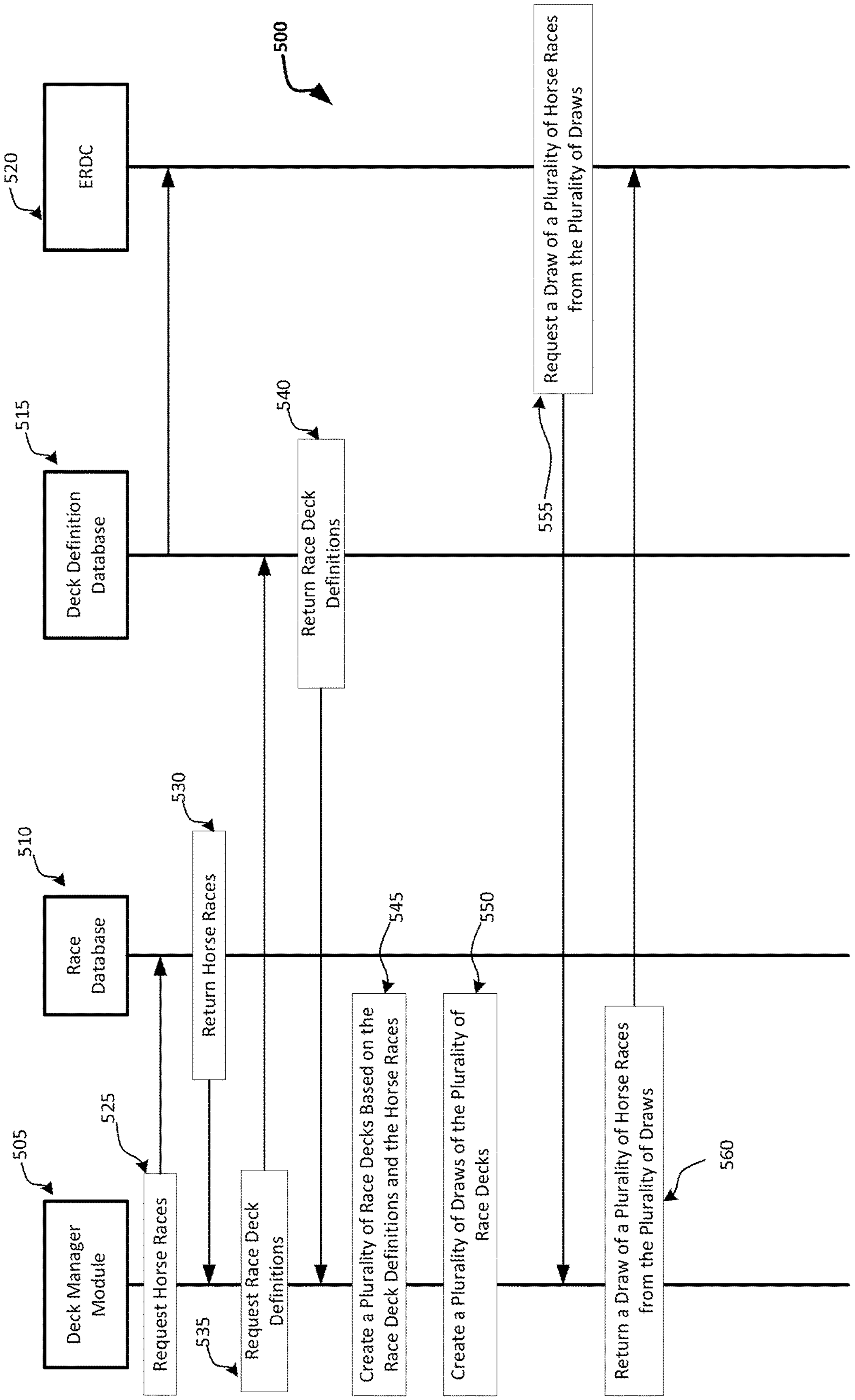
FIG. 5 illustrates communications and processes between different devices and/or modules of a subset of an improved historical horse race system according to some implementations of the present disclosure.

FIG. 5 illustrates communications and processes between different devices and/or modules of a subsystem of an improved historical horse race system 500 according to some implementations of the present disclosure. FIG. 5 relates to a subsystem that generates sets of historical horse races used in a gaming system and determines how the horse races can be organized and formed into race decks and draws of one or more race decks. In some implementations, one or more draws formed from the one or more race decks can be used to determine outcomes in a historical horse race game that uses a different type of game (e.g., a roulette game or other suitable game) as a player game interface. In some implementations, the devices and modules discussed in FIG. 5 correspond to the devices, modules, and tables discussed herein, such as in FIG. 1, FIG. 2A, FIG. 2B, FIG. 3A-FIG. 3G, FIG. 4A-4D, and FIG. 7.

In some implementations, as illustrated in FIG. 5, the subsystem may include several different modules and databases, such as deck manager module 505, race database 510, deck definition database 515, and ERDC 520. In some implementations, these are databases and modules that are included in one or more servers, such as discussed in connection with FIG. 7. In some implementations, the modules and databases in FIG. 5 may be part of one or more separate servers.

As discussed previously, the improved historical horse race game may use many previously run horse races and videos of such horse races. In some implementations, one end goal for the process described in FIG. 5 is to result in one or more usable sets of horse races that can be used to determine game outcomes (e.g., draws). One or more of these horse races, associated information, and associated videos of the races may be stored in race database 510. These stored horse races may number in the thousands. The horse races may come from horse races run at different days and times on a same track or from different tracks. In some implementations, to begin, deck manager module 505 may request a plurality of horse races from the race database 510. In some implementations, the deck manager module 505 may request all of the available horse races or some other suitable quantity of horse races as shown at 525. In some implementations, the larger the quantity of horse races used, the less likely it will be that a player can predict the horse races that will be used in a draw. The horse races can be sourced from one horse racing track or from multiple different horse racing tracks. In some implementations, the horse races may be supplied from multiple different databases and from multiple different sources.

In some implementations, as shown at 530, race database 510 may return the requested quantity of horse races to the deck manager module 505. To help organize the received horse races, in some implementations as shown at 535, the deck manager module 505 may request race deck definitions from the deck definition database 515. In some implementations, the race deck definitions are a way to sort and store horse races by one or more attributes/meta data/parameters of the horse races. For example, attributes/meta data/predetermined parameters can be stored in association with the horse race (e.g., the order of how the horses finish the race, such as taking first, second, third place). It should be appreciated that attributes/meta data/predetermined parameters can be any suitable feature associated with the horse races (e.g., horse name, weather, handicapping data, etc.). The race deck definitions from the deck definition database 515 may include instructions to create sets of horse races (e.g., each a deck of horse races) that meet a particular parameter. For example, the race deck definitions may provide instructions to create a race deck set of one or more horse races mapped to a roulette straight bet on the number 1. That is, horse races wherein horse 1 takes first place and horse 2 takes second place (See e.g., a straight bet on the number 1 in table 425 and the associated horse race bet in the column to the immediate right). The race deck definitions may provide instructions to create many different race deck sets of similar horse races. In some implementations, the race deck definitions may provide instructions to create 56 different race decks of similar horse races to match a particular game structure. In some implementations, the quantity of 56 different race decks is derived from the quantity of different bets that are available in the example roulette game discussed in connection with FIG. 3A-3G (e.g., as listed in FIG. 4C and FIG. 4D). In some implementations, the race deck definitions may mirror the horse race descriptions (e.g., horse race runners) found in tables 425, 430, 435, 440, 445, and 450. In some implementations, having 56 different race decks enables at least one horse race to be drawn for each of the possible roulette bets listed in these tables. However, a historical horse race game with a different roulette interface may use a different suitable quantity of race decks (e.g., a roulette game without 000 may use 55 race decks). Moreover, a different historical horse race game with a game interface using an alternative game, such as blackjack or craps, may use a different quantity of horse race videos to match with the greater variety of possible bets.

In some implementations, as shown at 540, the deck definition database 515 may return requested race deck definitions to the deck manager module 505. In some implementations, as shown at 545, the deck manager module 505 may create a plurality of race decks based on the race deck definitions and the received horse races. In some implementations, deck manager module 505 may randomly shuffle the order of the horse races in a particular race deck to avoid creating predictable sets of horse races. In some implementations, deck manager module 505 may reshuffle one or more created race decks periodically. In some implementations, one or more race decks may be reshuffled after a predetermined quantity of horse races are used from a race deck. In some implementations, one or more race decks may include a “cut card” or some other suitable indicator to reshuffle the race deck when such indicator is selected for a draw.

In some implementations, as shown at 550, the deck manager module 505 may also create a plurality of draws of the plurality of race decks 550. In some implementations, the deck manager does not create a plurality of draws of the plurality of race decks. In some implementations, as discussed previously, draws are not created until one or more randomly generated horse race selection values are determined because the draws can be defined by the randomly generated horse race selection value. However, in some implementations, one or more draws can be created independent of the randomly generated horse race selection value. As previously noted, a draw is a set of horse races taken from one or more race decks. In some implementations, a draw is the first horse race from one or more race decks. As an illustration of a draw, FIG. 3G illustrates some columns of horse races (e.g., wherein one column of horse races represents a race deck) wherein the first horse races in the different race decks are selected for a draw. In the case of the roulette example that is discussed herein, a draw may include six horse races from six different race decks (e.g., representing the six types of possible outcomes in a roulette game associated with one ball outcome-represented in the six tables in FIG. 4C and FIG. 4D). In some alternative implementations, a draw may include 56 horse race (e.g., one from the various different available race decks). Using columns of horse races in FIG. 3G again for illustration, a first draw may include the horse races labeled horse race video 1 across the top row, a second draw may include the horse races labeled horse race video 2 from the different columns, etc. It should be appreciated that while FIG. 3E displays fewer than the 56 race decks mentioned herein, in some implementations, a first draw may include all or some of the horse races labeled horse race 1, a second draw may include all or some of the horse races labeled horse race 2, etc. In some implementations, a draw may include selecting a different mixture of the horse races according to the order of the horse races from different race decks. For example, in some implementations, a draw may include a horse race 1 from one race deck and horse race 10 from another race deck. It should be appreciated that any suitable combination of horse race selections can be made from the race decks to form a draw.

In some implementations, as shown at 555, ERDC 520 may request at least one draw from the deck manager module 505. In some implementations, the request from the ERDC 520 may be for at least one draw from the plurality of predetermined draws stored in deck manager module 505. As previously discussed, in some alternative implementations, the ERDC 520 may request a draw on an ad-hoc basis in accordance with the ERDC 520 receiving a request for a draw from another server (e.g., a roulette event server), wherein the draw is created based on a randomly selected horse race selection value. In some implementations, as shown at 560, the deck manager module 505 may return a draw to the ERDC 520. In some implementations, the deck manager module 505 may return more than one draw to the ERDC 520. In some implementations, the ERDC 520 may hold one or more predetermined draws of the horse races until a draw is requested by an authorized device, such a roulette event server (e.g., roulette event server 110).

Figure 6:
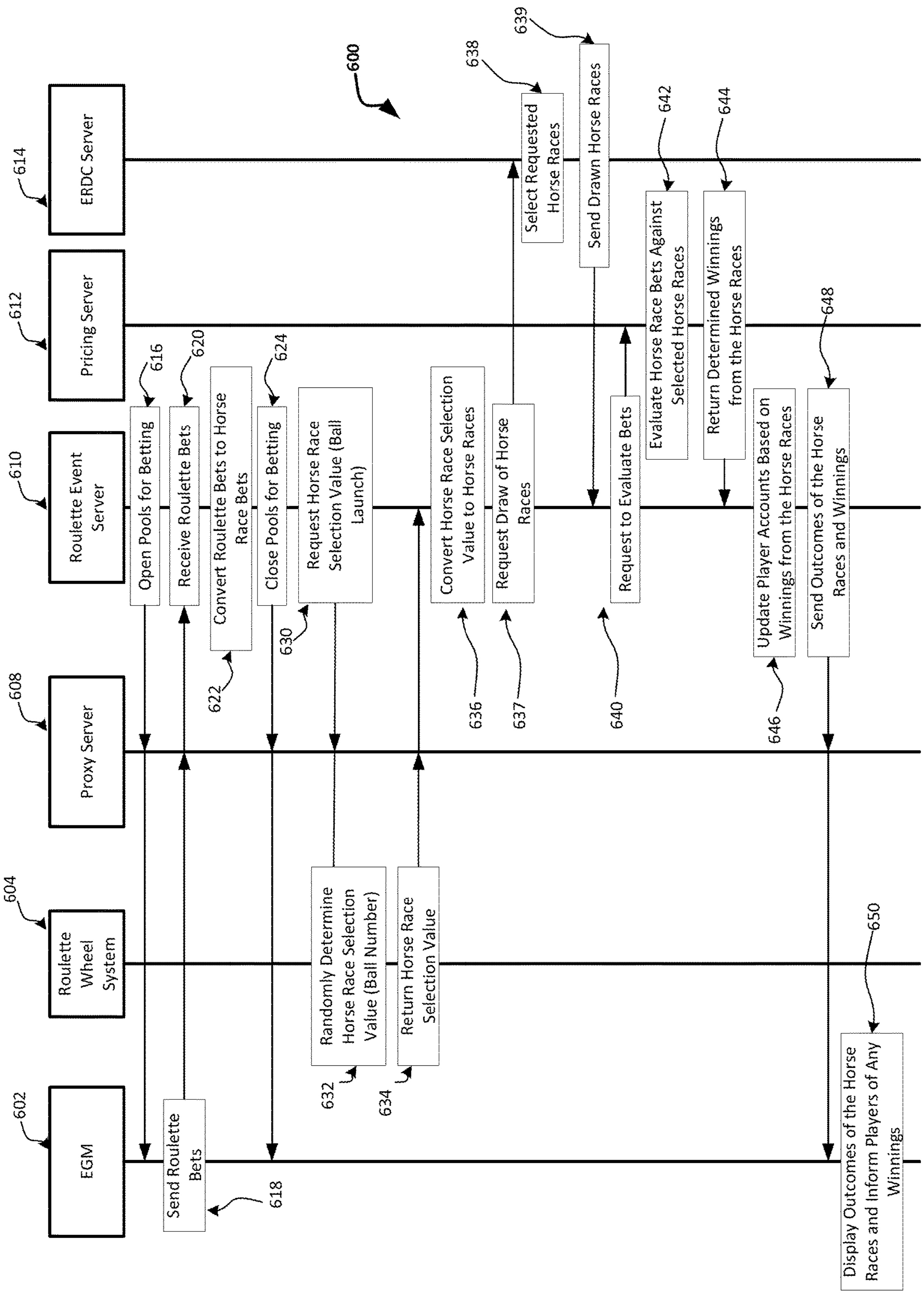
FIG. 6 illustrates communications and processes between different devices and/or modules of an improved historical horse race system according to some implementations of the present disclosure.

FIG. 6 illustrates communications and processes between different devices and/or modules of an improved historical horse race gaming system 600 according to some implementations of the present disclosure. In some implementations, FIG. 6 relates to using one or more horse races to determine outcomes in a historical horse race game that uses at least one different type of game (e.g., a roulette game) as a player game interface. In some implementations, the devices and modules discussed in FIG. 6 correspond to the devices, modules, and tables discussed herein, such as in FIG. 1, FIG. 2A, FIG. 2B, FIG. 3A-FIG. 3G, FIG. 4A-4D, FIG. 5, FIG. 7, and FIG. 8. In some implementations, FIG. 6 provides a further visualization of the methods discussed in connection with FIG. 2A and FIG. 2B as applied to the system described in FIG. 1.

In some implementations, as illustrated in FIG. 6, the gaming system may include several different modules and databases, such as an EGM 602, a roulette wheel system 604 (also referred to herein as a horse race selection generator), a proxy server 608, a roulette event server 610, a pricing server 612, and an ERDC server 614. When the game is ready for operation, the roulette event server 610 may send a message to an EGM 602 that bets can be placed as shown at 616. As noted herein, one or more bets may be segregated into one or more different parimutuel wagering pools. In some implementations, the message is routed to proxy server 608 and then proxy server 608 sends the messages that bets can be placed to the EGM 602. It should be noted that the proxy server 608 may send the message regarding bets to one or more EGMs (not shown in FIG. 6).

In some implementations, as shown at 618, the EGM 602 may send one or more received roulette bets back to the roulette event server 610. As shown in FIG. 6, the roulette bets may initially be sent to the proxy server 608 for processing before being sent to the roulette event server 610. As shown at 620, the roulette event server 610 may receive the roulette bets sent from the EGM 602. In some implementations, as shown at 622, the roulette event server 610 may convert one or more roulette bets to horse race bets. In some implementations, the conversion is based on mapping tables, such as found in FIG. 4C and FIG. 4D. However, other suitable conversion tables can be used. In some implementations, as shown at 624, the roulette event server 610 may transmit a message to close or block the parimutuel wagering pools from further betting. In some implementations, the roulette event server 610 converts one or more roulette bets into horse race bets before wagering pools are closed. In some implementations, this is because roulette event server 610 does not accept horse race bets after a cutoff time, such as when the wagering pools are closed. In some alternative implementations, the roulette event server 610 converts one or more roulette bets into horse race bets at different times, such as after wagering pools are closed. In some implementations, the roulette event server 610 transmits the message to proxy server 608 and the proxy server 608 transmits the message to EGM 602. In some implementations, the EGM 602 may track a period of time from when the parimutuel wagering pools were opened and automatically stop accepting new player bets after a predetermined period of time.

In some implementations, as shown at 630, the roulette event server 610 may request generation of a horse race selection value (e.g., in the case or a roulette wheel—a ball launch) at the roulette wheel system 604. In some implementations, as noted in FIG. 6, the request may be routed through the proxy server 608 and the proxy server 608 may transmit the horse race selection value request to the roulette wheel system 604. In some implementations, the roulette wheel system 604 may spin a roulette wheel and launch the associate roulette ball or initiate some other form of random number generation based on the request for the horse race selection value.

In some implementations, as shown at 632, the roulette wheel system 604 may determine a randomly generated horse race selection value based on which pocket the roulette ball landed on the roulette wheel. As noted above, in some implementations the roulette wheel system 604 may determine a randomly generated horse race selection value in a suitable alternative way. In some implementations, as shown at 634, the roulette wheel system 604 may transmit a message back to roulette event server 610 indicating the randomly selected horse race selection value. In some implementations, as shown in FIG. 6, roulette wheel system 604 may transmit the message to proxy server 608 and then proxy server 608 may transmit the message to the roulette event server 610.

In some implementations, as shown at 636, the roulette event server 610 may convert the received randomly generated horse race selection value into one or more types of horse races that will be used to evaluate the player bets received at 618 (e.g., as converted at 624). In some implementations, as noted previously, the conversion may first examine the type of roulette bets that would result in a winning outcome based on the roulette ball number (e.g., six different types of roulette bets in the example used herein—as illustrated in FIG. 3D and discussed in connection with FIG. 3D). In some implementations, the conversion at 636 may also determine the type of horse races to select based on a mapping between the previously determined six different types of roulette bets and type of horse race shown in the tables illustrated in FIGS. 4C and 4D (e.g., as also illustrated in FIG. 3D and discussed in connection with FIG. 3D).

In some implementations, as shown at 637, the roulette event server 610 may request a draw from the ERDC server 614. As discussed herein, in some implementations, a draw is a plurality of horse races that correspond to a race deck definition and can also be formed based on the randomly generated horse race selection value. In some implementations, the request for a draw from the ERDC server 614 may include the horse races determined at 636. For example, in some implementations, six types of horse races associated with particular attributes were determined during the conversion process at 636. Identifiers associated with these six types of horse races can be sent to the ERDC server 614 from the roulette event server 610. In some implementations, as shown at 638, ERDC server 614 selects horse races that match the identified six types of horse races to create a draw of horse races. For example, the ERDC server 614 may take a horse race from the different decks of horse races that matches the particular attributes identified at 636 (e.g., as also explained in connection with FIG. 3E) to form the draw of horse races. In some implementations, the ERDC server 614 may work with a deck manager to form the draw using the different predefined decks of horse races. In some implementations, as shown at 639, the ERDC server 614 may send the draw of the plurality of horse races to the roulette event server 610.

In some implementations, as shown at 640, roulette event server 610 may send the player's horse race bets determined at 624 and the selected horse races determined at 638 to pricing server 612 to evaluate the bets. In some implementations, at shown at 642, the pricing server 612 may evaluate player's horse race bets against outcomes of horse races in the selected horse races and calculate the payouts for winning bets. In some implementations, as shown at 644, the pricing server 612 may return the determined outcomes and winning payouts for the player's horse race bets to the roulette event server 610. In some implementations, as shown at 646, the roulette event server 610 may update player accounts based on the winnings payouts determined at the pricing server 612. In some implementations, as shown at 648, the roulette event server 610 may send outcomes of the horse races, winning payout information, and at least a portion of the selected horse race videos to the players through EGM 602. In some implementations, the information at 648 is sent through proxy server 608 and then proxy server 608 sends the information to EGM 602. In some implementations, as shown at 650, the EGM 602 may display outcomes of the horse races (e.g., including at least a portion of the selected horse race videos) and inform player of any winning payouts 650.

In some implementations that use the roulette event server 610, one of the technical improvements of the improved historical horse race gaming system 600 is a significant reduction in game processing and network message processing that is handled by the pricing server 612. In traditional horse race game system environments, the pricing server 612 handles much of the game processing and network messaging processing load of the gaming system, since much of this processing load is related to totalizator processing functions (e.g., calculating pari-mutuel processes). By using a roulette event server in some implementations, such as roulette event server 610, to handle the much of the game processing and network messaging load of the improved historical horse race system 600 as shown in FIG. 6, this significantly reduces the volume of game processing and network messaging handled by the pricing server 612. Since the features described in improved historical horse race gaming system 600 include new game processing and new network message processing loads related to the improved historical horse race game, pricing server 612 does not need to be upgraded to handle the increased computational load that is performed by roulette event server 610. Pricing server 612 can continue to focus on its core totalizator functions without being degraded.

FIG. 7 is a block diagram illustrating an electronic race day control (ERDC) server, according to some implementations of the present disclosure. In some implementations, ERDC server 700 in FIG. 7 is one possible representation of an ERDC server previously described, such as ERDC 120, the ERDC server discussed in connection with FIG. 2A and FIG. 2B, the ERDC 520, and the ERDC server 614 previously discussed. In some implementations, ERDC server 700 may include one or more computing platforms. ERDC server 700 may be configured to communicate with one or more devices (e.g., roulette event servers, pricing servers, etc.) according to a client/server architecture, a peer-to-peer architecture, and/or other suitable architectures. Users may interact with the ERDC server 700 via certain devices (e.g., roulette event server 610 or other suitable devices) as discussed herein. In some implementations, the ERDC server 700 may include one or more processers 702, one or more electronic storage devices 715, 717, 720 (e.g., non-transitory memory devices), and machine-readable instructions 704. In some implementations, the ERDC server 700 may include, but is not limited to, a deck manager module 710, a race database 717, a deck definition database 720 and an electronic race day control module 730.

ERDC server 700 may be configured by machine-readable instructions 704. Machine-readable instructions 704 may include one or more instruction modules. The instruction modules may include computer program modules. The instruction modules may include one or more of a deck manager module 710, and an electronic race day control module 730, and/or other instruction modules.

In some implementations, deck manager module 710 is configured to execute and run in the background on the ERDC server 700 to create decks of horse races (a deck is a set of horse races with similar race attributes that are associated or mapped with a bet in a different type of game—such as a straight bet in a roulette game). In some implementations, the different decks of horse races can be grouped into horse race sets, known as draws. In some implementations, draws of horse races can be created on an ad-hoc basis. In some implementations, draws of horse races can be created and stored for later retrieval. In some implementations, as discussed above, the deck manager module 710 may generate one or more draws of decks of horse races on an ad-hoc basis, such as when receiving a request for a draw from the decks of horse races. In some implementations, a draw from the decks of horse races can be formed based on a randomly generated horse race selection value (e.g., using the types of horse races defined by the randomly generated horse race selection value), or using some other suitable technique. In some implementations, a draw of decks of horse races or multiple draws of decks of horse races can be created based on definitions from the deck definition database 720. In some implementations, a deck of horse races can contain a cut indicator that, when reached in the deck, causes the deck manager module 710 to reshuffle one or more decks of horse races. In some implementations, the deck manager module 710 may generate a predetermined number of draws of decks of horse races. In some implementations, draw sets of different horse races can be reshuffled at a pre-defined interval of time or at a random interval period of time, if one or more draws are not used. In some implementations, an ERDC server 700 may include one or more running instances of a deck manager module 710.

In some implementations, race database 717 contains a listing of available horse races (e.g., historical horse races) and their associated information, such as metadata associated with the available horse races, and videos of such horse races. In some implementations, horse races stored in the race database 717 do not include historical horse races associated with scratches (e.g., a race where a horse that was entered to run in a race, but ultimately did not run in such race), dead heats (e.g., two or more horses that tie a race), or runners (e.g., horses) that did not finish a race. In some implementations, the horse races in the race database 717 may include the following information: track identifier, date of race, race number, number of runners (number of horses), horse race results, specialized rankings/analysis in various categories that can be used for handicapping the horse races.

In some implementations, deck definition database 720 is configured to service requests from the deck manager module 710. In some implementations, the deck definition database 720 contains the configuration of how a horse race deck is generated in the deck manager module 710. For example, a horse race deck definition for a roulette game may contain decks to support at least six horse races. In some implementations of a roulette game, a different horse race deck can be created and associated with various roulette bets, such as, but not limited to: single numbers, even, odd, red, black, numbers 1 through 18, numbers 19 through 36, numbers 1 through 12, numbers 13 through 24, numbers 25 through 36, and different columns. Some examples of a race deck are illustrated in FIG. 4C and FIG. 4D and previously discussed. In some implementations, a horse race deck may contain one horse race, but could alternatively contain many horse races, with no maximum limit. In some implementations, the deck definition database 720 may be configured to connect with one or more deck manager modules 710. The deck definition database 720 may exist on the same physical server as a deck manager module 710 or on a physically separate server.

In some implementations, electronic race day control module 730 (or ERDC 730) is configured to communicate with the deck manager module 710 to obtain one or more draws generated by the deck manager module 710 and provide one or more draws to a roulette event system (e.g., roulette event server 800, roulette event server 110, roulette event server 610, etc.). In some implementations, when the ERDC 730 runs out of draws, the ERDC 730 may request additional draws from the deck manager module 710. In some implementations, is configured to communicate with the deck manager module 710 to create one or more draws based on a randomly generated horse race selection value, as previously discussed.

While certain features and functions of the deck manager module 710, and/or electronic race day control module 730 were described, it should be appreciated that the features and functions of these modules are not limited to descriptions provided herein. Furthermore, additional features and functions of the ERDC server 700 and its modules have been described in greater detail herein.

In some implementations, ERDC server 700 may be operatively linked to other devices via one or more electronic communication links (e.g., network 190). For example, such electronic communication links may be established, at least in part, via a network such as the Internet and/or other networks. It will be appreciated that this is not intended to be limiting, and that the scope of this disclosure includes implementations in which ERDC server 700 may be operatively linked to other devices via some other communication system. In some implementations, ERDC server 700 may be operatively linked to other ERDC servers via suitable communication systems. By way of non-limiting example, a given ERDC server 700 may include one or more of a server and/or other suitable computing platforms.

ERDC server 700 may include electronic storage 715, one or more processors 702, and/or other components. ERDC server 700 may include communication lines, or ports to enable the exchange of information with a network and/or other computing platforms. Illustration of ERDC server 700 in FIG. 7 is not intended to be limiting. ERDC server 700 may include a plurality of hardware, software, and/or firmware components operating together to provide the functionality attributed herein to ERDC server 700. For example, ERDC server 700 may be implemented by a cloud of computing platforms operating together as ERDC server 700.

Electronic storage 715 may comprise non-transitory storage media that electronically stores information. The electronic storage media of electronic storage 715 may include one or both of system storage that is provided integrally (i.e., substantially non-removable) with ERDC server 700 and/or removable storage that is removably connectable to ERDC server 700 via, for example, a port (e.g., a USB port, a firewire port, etc.) or a drive (e.g., a disk drive, etc.). Electronic storage 715 may include one or more of optically readable storage media (e.g., optical disks, etc.), magnetically readable storage media (e.g., magnetic tape, magnetic hard drive, etc.), electrical charge-based storage media (e.g., EEPROM, RAM, etc.), solid-state storage media (e.g., flash drive, etc.), and/or other electronically readable storage media. Electronic storage 715 may include one or more virtual storage resources (e.g., cloud storage, a virtual private network, and/or other virtual storage resources). Electronic storage 715 may store software algorithms, information determined by processor(s) 702, information received from ERDC server 700, information received from other devices (e.g., EGMs, centers, etc.), and/or other information that enables ERDC server 700 to function as described herein. In some implementations, race database 717 and deck definition database 720 can be similarly configured to electronic storage 715.

Processor(s) 702 may be configured to provide information processing capabilities in ERDC server 700. As such, processor(s) 702 may include one or more of a digital processor, an analog processor, a digital circuit designed to process information, an analog circuit designed to process information, a state machine, and/or other mechanisms for electronically processing information. Although processor(s) 702 is shown in FIG. 7 as a single entity, this is for illustrative purposes only. In some implementations, processor(s) 702 may include a plurality of processing units. These processing units may be physically located within the same device, or processor(s) 702 may represent processing functionality of a plurality of devices operating in coordination. Processor(s) 702 may be configured to execute deck manager module 710, electronic race day control module 730, and/or other modules. Processor(s) 702 may be configured to execute deck manager module 710, electronic race day control module 730, and/or other modules by software; hardware; firmware; some combination of software, hardware, and/or firmware; and/or other mechanisms for configuring processing capabilities on processor(s) 702. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although deck manager module 710, electronic race day control module 730 are illustrated in FIG. 7 as being implemented within a single processing unit, in implementations in which processor(s) 702 includes multiple processing units, one or more of deck manager module 710, electronic race day control module 730 may be implemented remotely from the other modules. The description of the functionality provided by the different deck manager module 710, and/or electronic race day control module 730 described herein is for illustrative purposes, and is not intended to be limiting, as any of deck manager module 710, and/or electronic race day control module 730 may provide more or less functionality than is described. For example, one or more of deck manager module 710, and/or electronic race day control module 730 may be eliminated, and some or all of its functionality may be provided by other ones of deck manager module 710, and/or electronic race day control module 730. As another example, processor(s) 702 may be configured to execute one or more additional modules that may perform some or all of the functionality attributed herein to one of deck manager module 710, and/or electronic race day control module 730.

FIG. 8 is a block diagram illustrating a roulette event server 800 according to some implementations of the present disclosure. In some implementations, roulette event server 800 in FIG. 8 is one possible representation of roulette event server previously discussed (e.g., roulette event server 110, roulette event server 610, etc.). In some implementations, roulette event server 800 may include one or more computing platforms. Roulette event server 800 may be configured to communicate with one or more devices (e.g., EGMs, ERDC servers, proxy servers, etc.) according to a client/server architecture, a peer-to-peer architecture, and/or other suitable architectures. Users may access roulette event server 800 via certain devices (e.g., EGMs, proxy servers, or other suitable devices) as discussed herein. In some implementations, the roulette event server 800 may include one or more processers 802, one or more electronic storage devices 815 (e.g., non-transitory memory devices), and machine-readable instructions 804. In some implementations, the roulette event server 800 may include modules such as a roulette event system module 810.

Roulette event server 800 may be configured by machine-readable instructions 804. Machine-readable instructions 804 may include one or more instruction modules. The instruction modules may include computer program modules. The instruction modules may include one or more of a roulette event system module 810 and/or other instruction modules.

In some implementations, roulette event system module 810 is configured to execute and run in the background on the roulette event server 800 to, among other things, control the opening and closing of pari-mutuel betting pools, accept and process wager and cancel wager requests, instruct one or more roulette wheel systems (e.g., roulette wheel system 180, roulette wheel system 604, etc.) to release a roulette ball and spin the roulette wheel (e.g., to generate a horse race selection value), determine the outcome of a roulette wheel spin, and establish and select appropriate horse races obtained from the ERDC. Once the roulette event system module 810 receives the ball landing position (e.g., outcome of a roulette wheel spin), the roulette event system module 810 can select the corresponding races obtained from an ERDC. In some implementations, the roulette event server 800 communicates with devices in a historical horse racing gaming system using the roulette event system module 810 via secure and encrypted communications. In some implementations, a roulette event server 800 may include one or more running instances of a roulette event system module 810.

While certain features and functions of the roulette event system module 810 were described, it should be appreciated that the features and functions of these modules are not limited to the description herein. Furthermore, additional features and functions of the roulette event server 800 and its modules were described in further detail herein.

In some implementations, roulette event server 800 may be operatively linked to other devices via one or more electronic communication links (e.g., network 190). For example, such electronic communication links may be established, at least in part, via a network such as the Internet and/or other networks. It will be appreciated that this is not intended to be limiting, and that the scope of this disclosure includes implementations in which roulette event server 800 may be operatively linked to other devices via some other communication media. In some implementations, roulette event server 800 may be operatively linked to other roulette event servers via suitable communication media. By way of non-limiting example, roulette event server 800 may include one or more of a server and/or other computing platforms.

Roulette event server 800 may include electronic storage 815, one or more processors 802, and/or other components. Roulette event server 800 may include communication lines, or ports to enable the exchange of information with a network and/or other computing platforms. Illustration of roulette event server 800 in FIG. 8 is not intended to be limiting. Roulette event server 800 may include a plurality of hardware, software, and/or firmware components operating together to provide the functionality attributed herein to roulette event server 800. For example, roulette event server 800 may be implemented by a cloud of computing platforms operating together as roulette event server 800.

Electronic storage 815 may comprise non-transitory storage media that electronically stores information. The electronic storage media of electronic storage 815 may include one or both of system storage that is provided integrally (i.e., substantially non-removable) with roulette event server 800 and/or removable storage that is removably connectable to roulette event server 800 via, for example, a port (e.g., a USB port, a firewire port, etc.) or a drive (e.g., a disk drive, etc.). Electronic storage 815 may include one or more of optically readable storage media (e.g., optical disks, etc.), magnetically readable storage media (e.g., magnetic tape, magnetic hard drive, etc.), electrical charge-based storage media (e.g., EEPROM, RAM, etc.), solid-state storage media (e.g., flash drive, etc.), and/or other electronically readable storage media. Electronic storage 815 may include one or more virtual storage resources (e.g., cloud storage, a virtual private network, and/or other virtual storage resources). Electronic storage 815 may store software algorithms, information determined by processor(s) 802, information received from roulette event server 800, information received from other devices, and/or other information that enables roulette event server 800 to function as described herein.

Processor(s) 802 may be configured to provide information processing capabilities in roulette event server 800. As such, processor(s) 802 may include one or more of a digital processor, an analog processor, a digital circuit designed to process information, an analog circuit designed to process information, a state machine, and/or other mechanisms for electronically processing information. Although processor(s) 802 is shown in FIG. 8 as a single entity, this is for illustrative purposes only. In some implementations, processor(s) 802 may include a plurality of processing units. These processing units may be physically located within the same device, or processor(s) 802 may represent processing functionality of a plurality of devices operating in coordination. Processor(s) 802 may be configured to execute roulette event system module 810 and/or other modules. Processor(s) 802 may be configured to execute roulette event system module 810 and/or other modules by software; hardware; firmware; some combination of software, hardware, and/or firmware; and/or other mechanisms for configuring processing capabilities on processor(s) 802. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the roulette event system module 810 is illustrated in FIG. 8 as being implemented within a single processing unit, in implementations in which processor(s) 802 includes multiple processing units, one or more of the roulette event system modules 810 may be implemented remotely from the other modules. The description of the functionality provided by the roulette event system module 810 described herein is for illustrative purposes, and is not intended to be limiting, as the roulette event system module 810 may provide more or less functionality than is described. For example, roulette event system module 810 may be eliminated, and some or all of its functionality may be provided by other devices or modules, such as the ERDC server 700. As another example, processor(s) 802 may be configured to execute one or more additional modules that may perform some or all of the functionality attributed the roulette event system module 810.

It should be appreciated that the improved historical horse race gaming system disclosed herein provides a new type of historical horse race game. In some implementations, the improved historical horse race gaming system enables players to use familiar game interfaces, such as a roulette table, and turn roulette style game play into legally permitted horse race wagers.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations have been described. Various modifications may be made without departing from the spirit and scope of the description. For example, various forms of the flow charts shown above may be used, with steps re-ordered, added, or removed. Accordingly, other implementations are within the scope of the following claims.

What is claimed:

1. A method of operating a gaming server, comprising:

receiving a plurality of a first game selections associated with a first game;

converting the plurality of first game selections into a plurality of horse race game selections, wherein the first game is different from a horse race game;

sending, to a horse race selection generator, a request for a randomly generated horse race selection value;

receiving a randomly generated horse race selection value;

requesting, from an electronic race day control server (ERDC), a draw of horse races based on the randomly generated horse race selection value;

selecting, using the ERDC, a subset of a plurality of horse race decks from a plurality of available horse race decks, wherein the selection of the subset of the plurality of horse race decks is made based on matching horse race parameters associated with the plurality of horse race decks and horse race parameters that are associated with the randomly generated horse race selection value;

selecting, using the ERDC, a plurality of horse races from the subset of the plurality of horse race decks;

receiving the plurality of horse races from the ERDC that are based on the randomly generated horse race selection value;

determining game outcomes based on the plurality of horse race game selections and at least one of the received plurality of horse races;

updating at least one player account associated with the plurality of first game selections according to the determined game outcomes; and sending the game outcomes and a video of the at least one of the received plurality of horse races to at least one electronic game machine.

2. The method of operating the gaming server of claim 1, wherein the first game selections are associated with wagers, wherein the wagers are associated with at least one wagering pool.

3. The method of operating the gaming server of claim 1, wherein the received plurality of horse races correspond to different horse race wagers.

4. The method of operating the gaming server of claim 1, further comprising:

determining the game outcomes by comparing the plurality of horse race game selections against the race outcomes in the received plurality of horse races.

5. The method of operating the gaming server of claim 1, wherein the request for the randomly generated horse race selection value is sent to a random number generator that is associated with the first game.

6. The method of operating the gaming server of claim 5, wherein the first game uses a physical wheel to enable determination of a randomly generated horse race selection value.

7. The method of operating the gaming server of claim 5, wherein the first game uses a physical roulette wheel to determine the randomly generated horse race selection value.

8. The method of operating the gaming server of claim 5, wherein the first game uses at least one die to determine the randomly generated horse race selection value.

9. The method of operating the gaming server of claim 5, wherein the first game uses an electronic random number generator to determine the randomly generated horse race selection value.

10. The method of operating the gaming server of claim 1, wherein the plurality of first game selections comprise a plurality of wagers on the first game and the plurality of horse race game selections comprise a plurality of horse race wagers.

11. The method of operating the gaming server of claim 10, further comprising sending a request to a pricing system to determine prices for the plurality of horse race wagers.

12. The method of operating the gaming server of claim 10, wherein determining the game outcomes based on the plurality of horse race wagers and the at least one of the received plurality of horse races further comprises:

evaluating the plurality of horse race wagers against an outcome in the at least one of the received plurality of horse races; and calculating payouts for at least one wagering pool associated with the first game selections.

13. The method of operating the gaming server of claim 12, further comprising calculating the payouts for a plurality of wagering pools associated with different ones of the first game selections.

14. The method of operating the gaming server of claim 1, wherein sending the game outcomes and the video of the at least one of the received plurality of horse races to the at least one electronic game machine further comprises sending the game outcomes and the video of the at least one of the received plurality of horse races through a proxy server.

15. The method of operating the gaming server of claim 1, wherein the plurality of the first game selections associated with the first game comprise different wagers made in a roulette game, wherein at least two wagers of the different wagers are associated with different parimutuel wager pools.

16. The method of operating the gaming server of claim 15, wherein a first wager of the different wagers made in the roulette game is converted into a first type of horse race wager on a first horse race and a second wager of the different wagers made in the roulette game is converted into a second type of horse race wager on a second horse race.

17. The method of operating the gaming server of claim 15, wherein a first wager of the different wagers made in the roulette game is converted into a first horse race wager on a horse race and a second wager of the different wagers made in the roulette game is converted into a second horse race wager on the horse race, wherein the second horse race wager selects at least one different horse to win from at least one horse selected to win in the first horse race wager.

18. A gaming server, comprising:

at least one processor; and at least one memory that stores computer executable instructions, wherein, when the computer executable instructions are executed by the at least one processor, the at least one processor is configured to:

receive a plurality of a first game selections associated with a first game;

convert the plurality of first game selections into a plurality of horse race game selections, wherein the first game is different from a horse race game;

send, to a horse race selection generator, a request for a randomly generated horse race selection value;

receive a randomly generated horse race selection value;

request, from an electronic race day control server (ERDC), a draw of horse races based on the randomly generated horse race selection value;

select, using the ERDC, a subset of a plurality of horse race decks from a plurality of available horse race decks, wherein the selection of the subset of the plurality of horse race decks is made based on matching horse race parameters associated with the plurality of horse race decks and horse race parameters that are associated with the randomly generated horse race selection value;

select, using the ERDC, a plurality of horse races from the subset of the plurality of horse race decks;

receiving the plurality of horse races from the ERDC that are based on the randomly generated horse race selection value;

determine game outcomes based on the plurality of horse race game selections and at least one of the received plurality of horse races;

update at least one player account associated with the plurality of first game selections according to the determined game outcomes; and send the game outcomes and a video of the at least one of the received plurality of horse races to at least one electronic game machine.

19. The gaming server of claim 18, wherein the first game selections are associated with wagers, wherein the wagers are associated with at least one wagering pool.

20. The gaming server of claim 18, wherein the received plurality of horse races correspond to different horse race wagers.

21. The gaming server of claim 18, wherein the computer executable instructions further cause the at least one processor to:

determine the game outcomes by comparing the plurality of horse race game selections against the race outcomes in the received plurality of horse races.

22. The gaming server of claim 18, wherein the request for the randomly generated horse race selection value is sent to a random number generator that is associated with the first game.

23. The gaming server of claim 22, wherein the first game uses a physical wheel to enable determination of the randomly generated horse race selection value.

24. The gaming server of claim 22, wherein the first game uses a physical roulette wheel to determine the randomly generated horse race selection value.

25. The gaming server of claim 22, wherein the first game uses at least one die to determine the randomly generated horse race selection value.

26. The gaming server of claim 22, wherein the first game uses an electronic random number generator to determine the randomly generated horse race selection value.

27. The gaming server of claim 18, wherein the plurality of first game selections comprises a plurality of wagers on the first game and the plurality of horse race game selections comprise a plurality of horse race wagers.

28. The gaming server of claim 27, wherein the computer executable instructions further cause the at least one processor to: send a request to a pricing system to determine prices for the plurality of horse race wagers.

29. The gaming server of claim 27, wherein when determining the game outcomes based on the plurality of horse race wagers and the at least one of the received plurality of horse races, the computer executable instructions further cause the at least one processor to:

evaluate the plurality of horse race wagers against outcomes in the at least one of the received plurality of horse races; and calculate payouts for at least one wagering pool associated with the first game selections.

30. The gaming server of claim 29, wherein the computer executable instructions further cause the at least one processor to: calculate the payouts for a plurality of wagering pools associated with different ones of the first game selections.

* * * * *